(12) United States Patent
Ulrey et al.

(10) Patent No.: US 10,393,070 B2
(45) Date of Patent: Aug. 27, 2019

(54) METHOD AND SYSTEMS FOR GASEOUS AND LIQUID PROPANE INJECTION

(71) Applicant: Ford Global Technologies, LLC, Dearborn, MI (US)

(72) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 15/490,426

(22) Filed: Apr. 18, 2017

(65) Prior Publication Data

US 2018/0298848 A1 Oct. 18, 2018

(51) Int. Cl.
| | | |
|---|---|---|
| F02M 21/02 | (2006.01) | |
| F02D 19/02 | (2006.01) | |
| F02M 31/20 | (2006.01) | |
| F02D 41/30 | (2006.01) | |
| F02D 41/00 | (2006.01) | |
| F02D 41/38 | (2006.01) | |

(52) U.S. Cl.
CPC ....... *F02M 21/0212* (2013.01); *F02D 19/022* (2013.01); *F02D 19/024* (2013.01); *F02D 41/0027* (2013.01); *F02D 41/3094* (2013.01); *F02M 21/0245* (2013.01); *F02M 21/0275* (2013.01); *F02M 21/0278* (2013.01); *F02M 21/0287* (2013.01); *F02M 31/20* (2013.01); *F02D 2041/389* (2013.01); *F02D 2041/3881* (2013.01); *Y02T 10/126* (2013.01); *Y02T 10/32* (2013.01)

(58) Field of Classification Search
CPC ........... F02M 21/0212; F02M 21/0245; F02M 31/20; F02D 19/022; F02D 19/024
See application file for complete search history.

(56) References Cited

U.S. PATENT DOCUMENTS

| | | | |
|---|---|---|---|
| 5,775,282 A | * | 7/1998 | Smith ................. F02D 19/0647 123/179.8 |
| 6,205,981 B1 | | 3/2001 | Lorraine |
| 6,422,203 B1 | | 7/2002 | Djordjevic |
| 9,080,518 B2 | | 7/2015 | Pursifull |
| 9,267,445 B2 | | 2/2016 | Pursifull |
| 9,322,355 B2 | | 4/2016 | Pursifull |
| 9,422,892 B2 | | 8/2016 | Pursifull |
| 9,523,326 B2 | | 12/2016 | Pursifull et al. |
| 9,617,927 B2 | | 4/2017 | Pursifull |
| 2009/0265078 A1 | * | 10/2009 | Mallebrein ............. F02D 41/40 701/103 |

(Continued)

FOREIGN PATENT DOCUMENTS

| | | |
|---|---|---|
| WO | 2015155359 A1 | 10/2015 |
| WO | WO 2015/181320 A1 * | 12/2015 |

*Primary Examiner* — Kevin A Lathers
(74) *Attorney, Agent, or Firm* — Julia Voutyras; McCoy Russell LLP

(57) ABSTRACT

Methods and systems are provided for fueling an engine with liquefied petroleum gas (LPG). In one example, a method may comprise pumping (LPG) from a fuel tank to a direct injection rail and not to a port injection rail. The method may further comprise supplying LPG from the direct injection rail to a port injection rail without returning the LPG to the fuel tank.

18 Claims, 5 Drawing Sheets

(56) References Cited

U.S. PATENT DOCUMENTS

2011/0290203 A1* 12/2011 Pursifull ............ F02D 19/0605
                                                    123/41.08
2012/0041665 A1*  2/2012 Pursifull ................... F01B 1/02
                                                    701/103

* cited by examiner

METHOD AND SYSTEMS FOR GASEOUS AND LIQUID PROPANE INJECTION

FIELD

The present description relates generally to methods and systems for injecting liquefied petroleum gas (LPG).

BACKGROUND/SUMMARY

Liquefied petroleum gas (LPG), primarily comprised of propane, may be used to fuel an internal combustion engine. LPG may be delivered to an engine in various phases (e.g., liquid and gaseous). In some examples, engine systems may only include direct injectors; however, direct injection of LPG may not be suitable under relatively hot conditions because liquid LPG may vaporize. In other examples, engine systems may only include port injectors; however, port injection of LPG may not be suitable under relatively cool conditions because gaseous LPG may condense. To address this issue, some engine systems may include both direct and port injection in what is commonly referred to as port fuel direct injection (PFDI). In such PFDI systems, fuel is lifted from a fuel tank by a lift pump and is then either directly supplied to the port injection fuel rail, or is supplied to a higher pressure direct injection pump before continuing on to the direct injection fuel rail.

However, the inventors herein have recognized potential issues with such PFDI systems when fueling with LPG. As one example, liquefied petroleum gas (LPG), has a relatively low super critical temperature of about 96° C. If the temperature of the direct injection rail increases above the super critical temperature of the LPG, LPG in the direct injection rail may vaporize before it is injected to the engine which may result in air-fuel ratio errors and an increase in engine knock.

As another example, PFDI systems typically include fuel return lines that return excess fuel to the fuel tank. For example, a fuel return line may couple the direct injection fuel rail to the fuel tank for returning fuel from the direct injection fuel rail to the fuel tank. However, such return lines increase the temperature of the LPG in the fuel tank, and thereby increase vaporization of the LPG in the fuel system. If LPG vapors reach an inlet of the direct injection pump, they may impair and/or reduce the volumetric efficiency of the pump. As such, direct injection pumps may require a pump cooling system and/or significant pressure enhancement, both of which increase costs and complexity of the fuel system.

In one example, the issues described above may be at least partially addressed by a method comprising: supplying liquefied petroleum gas (LPG) from a fuel rail to a direct injection injector that injects fuel directly into a cylinder of an engine, and flowing LPG from the fuel rail to an intake fuel injector that is not a direct injection injector without returning the LPG to a fuel tank, where the intake fuel injector injects fuel, from a position outside the cylinder, into an intake passage that feeds the cylinder.

In another representation a method for an engine may comprise pumping: pumping LPG from a fuel tank to a direct injection (DI) fuel rail; directly injecting liquid LPG into at least one cylinder of the engine via one or more direct injectors coupled to the DI fuel rail; and ejecting vaporized LPG from the DI fuel rail to an intake injector that is not a direct injector without returning the vaporized LPG to the fuel tank. The method may further comprise deactivating a direct injection or higher pressure pump.

In another representation a fuel system may comprise: a lift pump; a direct injection fuel rail coupled to the lift pump via a first fuel supply line; a port injection fuel rail coupled downstream, and in series with, the direct injection fuel rail via a second fuel supply line, where the port injection fuel rail and second fuel supply line are at a lower pressure than the direct injection fuel rail; an injector coupled between the direct injection fuel rail and the port injection fuel rail to supply fuel from the direct injection fuel rail to the port injection fuel rail; and a controller in electrical communication with the lift pump and injector, the controller including computer-readable instruction stored in non-transitory memory to: feedback control the lift pump in a low pressure direct injection mode; and feedback control the injector to maintain a pressure of the port injection fuel rail below a pressure of the direct injection fuel rail and below an LPG liquid-to-gas phase change pressure, the LPG liquid-to-gas phase change pressure based on a temperature of the port injection fuel rail.

By low pressure direct injecting LPG into the engine cylinders, the higher pressure direct injection pump may be removed/omitted from the fuel system, reducing the cost and complexity of the fuel system. In examples where the direct injection pump is retained in the fuel system, but is rendered inactive, pump longevity may be enhanced by reducing the amount of fuel vapors entering the pump inlet. Fuel vapors may be reduced by omitting fuel return lines in the fuel system, and cooling the direct injection rail with vapors sourced from the direct injection rail that have been depressurized (and thus cooled). Omitting the fuel return lines further reduces the cost and complexity of the fuel system.

Further, by cooling the direct injection rail with the depressurized LPG vapors, vaporization of LPG in the direct injection rail may be reduced, thereby reducing air-fuel ratio errors and engine knock when direct injecting LPG. Correspondingly, by heating the cooler, depressurized LPG vapors contained between the direct injection fuel rail and the port injection fuel rail, with the hotter direct injection fuel rail, condensation of LPG in the port fuel injection rail may be reduced, thereby reducing air-fuel ratio errors and increasing engine performance and robustness. As a result, robust LPG engine fueling may be achieved over a wider range of ambient and engine operating temperatures.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
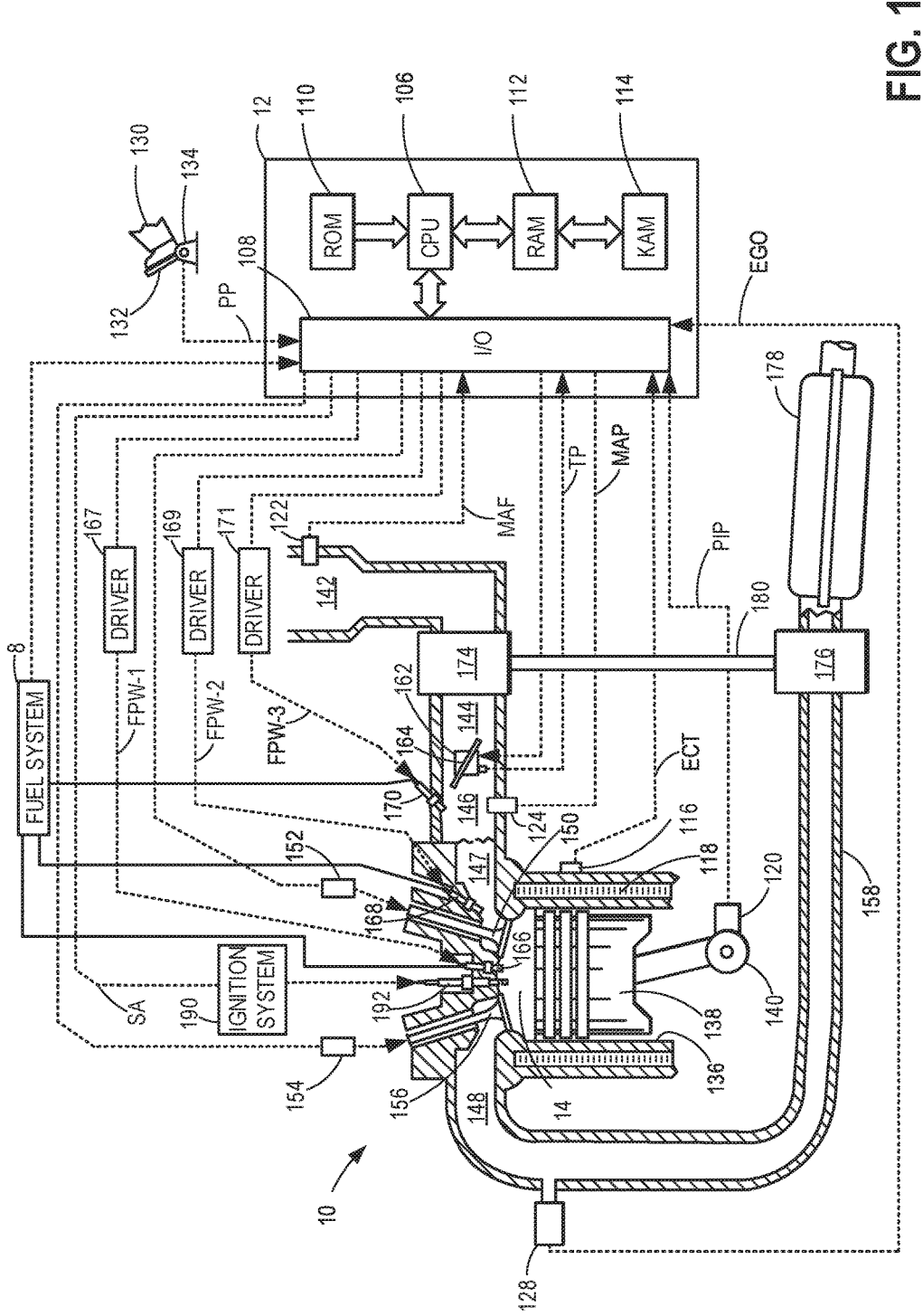
FIG. 1 shows a schematic diagram of an example engine system including a fuel system configured to inject liquefied petroleum gas (LPG), in accordance with an embodiment of the present disclosure.

The following description relates to systems and methods for operating a fuel system of an engine system, such as the example engine system shown in FIG. 1. The fuel system, such as the example port fuel direction injection (PFDI) fuel system shown in FIG. 2, may inject liquefied petroleum gas (LPG) directly into engine cylinders (direct injection) via low pressure direct injectors and/or into intake ducts (port injection) of the engine cylinders via port injectors. The "intake ducts" may also be referred to herein as "intake ports." As described in the example method of FIG. 3, vaporized LPG may be supplied to the port injection fuel rail from the direct injection (DI) fuel rail. The phase of the LPG (liquid or gas) may be determined by comparing the pressure and temperature of the LPG to a known liquid-gas phase change curve for LPG, an example of which is shown in FIG. 5. FIG. 4 shows an example method where, en route to the port injection fuel rail, the vaporized LPG gasses cool the LPG in the DI fuel rail. In this way, LPG in the DI fuel rail may be maintained in liquid form for injection directly into the engine cylinders, and LPG supplied to the PFI rail may be maintained in gaseous form for port injection into intake ports of the engine cylinders.

Regarding terminology used throughout this detailed description, a high pressure pump, or direct injection fuel pump, may be abbreviated as a HP pump (alternatively, HPP) or a DI fuel pump respectively. Accordingly, HPP and DI fuel pump may be used interchangeably to refer to the high pressure direct injection fuel pump. Similarly, a low pressure pump, may also be referred to as a lift pump. Further, the low pressure pump may be abbreviated as LP pump or LPP. Port fuel injection may be abbreviated as PFI while direct injection may be abbreviated as DI. Also, fuel rail pressure, or the value of pressure of fuel within the fuel rail (most often the direct injection fuel rail), may be abbreviated as FRP. The direct injection fuel rail may also be referred to as a high pressure fuel rail, which may be abbreviated as HP fuel rail. Also, the solenoid activated inlet check valve for controlling fuel flow into the HP pump may be referred to as a spill valve, a solenoid activated check valve (SACV), electronically controlled solenoid activated inlet check valve, and also as an electronically controlled valve. Further, when the solenoid activated inlet check valve is activated, the HP pump is referred to as operating in a variable pressure mode. Further, the solenoid activated check valve may be maintained in its activated state throughout the operation of the HP pump in variable pressure mode. If the solenoid activated check valve is deactivated and the HP pump relies on mechanical pressure regulation without any commands to the electronically-controlled spill valve, the HP pump is referred to as operating in a mechanical mode or in a default pressure mode. Further, the solenoid activated check valve may be maintained in its deactivated state throughout the operation of the HP pump in default pressure mode.

FIG. 1 depicts an example of a combustion chamber or cylinder of internal combustion engine 10. Engine 10 may also be referred to herein as engine system 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (herein also termed combustion chamber 14) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system (not shown). Further, a starter motor (not shown) may be coupled to crankshaft 140 via a flywheel (not shown) to enable a starting operation of engine 10.

Cylinder 14 can receive intake air via a series of intake air passages 142, 144, and 146, and 147. Intake air passages 142, 144, and 146 can communicate with other cylinders of engine 10 in addition to cylinder 14. However, intake air passage 147 comprises an intake duct, and may therefore communicate with only cylinder 14 depicted in the example of FIG. 1, and may not communicate with the other cylinders of engine 10. In some examples, one or more of the intake passages may include a boosting device such as a turbocharger or a supercharger. For example, FIG. 1 shows engine 10 configured with a turbocharger including a compressor 174 arranged between intake air passages 142 and 144, and an exhaust turbine 176 arranged along exhaust passage 158.

Intake air passage 146 may comprise a common intake manifold that supplies air to all of the cylinders of engine 10. Intake air passage 146 may therefore also be referred to herein as intake manifold 146. Thus, the engine intake may comprise a single common intake passage in the portion of the intake comprising the intake air passage 146. However, intake air passage 147 may comprise an intake duct, and as such may also be referred to herein as intake duct 14). Thus, the intake manifold 146 may split into separate intake ducts which each then go on to feed a distinct cylinder of engine 10. The split between the intake manifold 146 and the intake duct 147 is depicted in the example of FIG. 1, by the dotted line separating intake manifold 146 and intake duct 147. Thus, intake air passage 147 may comprise one of the intake ducts, where intake air passage 147 may be the intake duct that feeds the cylinder 14 depicted in the example of FIG. 1. Thus, the engine 10 may include more than one intake duct, to route air from the intake manifold 146 to each cylinder of the engine. Thus intake manifold 146 feeds all of the cylinders of engine 10, whereas intake duct 147 feeds only the depicted cylinder 14. The engine 10 includes separate intake ducts for each cylinder of engine 10, and thus the number of intake ducts included in the engine 10 may be equivalent to the number of cylinders of engine 10.

Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust manifold 148 can receive exhaust gases from other cylinders of engine 10 in addition to cylinder 14.

Exhaust gas sensor 128 is shown coupled to exhaust passage 158 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including fuel injectors 166, 168, and 170. However, in other examples, the engine 10 may only include fuel injectors 166 and 168 and may not include fuel injector 170. In yet further examples, the engine 10 may only include fuel injectors 166 and 170 and may not include fuel injector 168. Fuel injectors 166, 168, and 170 may be configured to deliver fuel received from fuel system 8. As elaborated in FIG. 2, fuel system 8 may include one or more fuel tanks, fuel pumps, and fuel rails. The fuel system 8 may include one or more fuels such as propane, butane, petrol, diesel, biofuels, etc. A more detailed example of fuel system 8 is described in greater detail below with reference to FIG. 2.

Fuel injector 166 is shown coupled directly to cylinder 14 for injecting fuel directly therein in proportion to the pulse width of signal FPW-1 received from controller 12 via electronic driver 167. In this manner, fuel injector 166 provides what is known as direct injection (hereafter referred to as "DI") of fuel into combustion cylinder 14. Thus, fuel injector 166 may also be referred to herein as DI fuel injector 166. The fuel injector 166 may be operated as a low pressure direct injector (LPDI) when injecting liquefied petroleum gas (LPG). Thus, the fuel injector 166 may inject LPG into the cylinder 14 while the cylinder pressure is relatively low as compared to what the cylinder pressure would be when injecting gasoline fuel for example. In the example of FIG. 1 injector 166 is shown positioned overhead cylinder 14 and piston 138, between the spark plug 192 and the intake valve 150. Such a position may improve mixing and combustion when operating the engine with an alcohol-based fuel due to the lower volatility of some alcohol-based fuels. However, in another example, the injector 166 may alternatively be located to the side of cylinder 14. In yet another example, the injector 166 may be located overhead, nearer the intake valve to improve mixing. Fuel may be delivered to fuel injector 166 from a fuel tank of fuel system 8 via a fuel pump and a fuel rail. Further, the fuel tank may have a pressure transducer providing a signal to controller 12. In some examples, the fuel supplied to the DI fuel injector 166 may only be pressurized by a lift pump of the fuel system 8 and not by a higher pressure direct injection pump. However, in other examples, such as where the fuel system 8 is not supplying LPG to the fuel injector 166, the fuel supplied to the injector 166 may be pressurized by both the lift pump and the higher pressure direct injection pump.

Fuel injector 168 is shown arranged in intake duct 147, rather than in cylinder 14, in a configuration that provides what is known as port injection of fuel (hereafter referred to as "PFI") into the intake port upstream of cylinder 14. Thus, fuel injector 168 may also be referred to herein as PFI fuel injector 168. Fuel injector 168 may inject fuel, received from fuel system 8 or from a fuel rail of the direct injector 166, in proportion to the pulse width of signal FPW-2 received from controller 12 via electronic driver 169. As explained in greater detail below with reference to FIG. 2, the fuel injector 168 may receive LPG that has vaporized and become gaseous. Thus, the fuel injector 168 may inject gaseous LPG. Note that a single electronic driver 167 or 169 may be used for both fuel injection systems, or multiple drivers, for example electronic driver 167 for fuel injector 166 and electronic driver 169 for fuel injector 170, may be used, as depicted.

As explained above, the intake duct 147 carries intake air from the common intake manifold 146 to a specific engine cylinder (cylinder 14 shown in the example of FIG. 1). Thus, the PFI fuel injector 168 injects fuel into a single intake duct, intake duct 147. In this way, only one cylinder (cylinder 14) may receive fuel injected by the injector 168. Further, the engine 10 may include more than one PFI fuel injector 168. Specifically, the engine 10 may include one PFI fuel injector 168 in each of the intake ducts to provide fuel to each of the cylinders of the engine 10.

Fuel injector 170 may be positioned in intake manifold 146, where the engine intake comprises a single, common passage that supplies airflow to all of the cylinders of engine 10. In such examples, the fuel injector 170 may deliver fuel into the common intake manifold 146, in what is commonly referred to as central fuel injection (CFI). Fuel injector 170 may therefore also be referred to herein as CFI fuel injector 170. Thus, fuel injected by fuel injector 170, may be delivered to any one or more of the cylinders of engine 10. In some examples, only one CFI fuel injector 170 may be included in intake manifold 146 to deliver CFI. However, more than one CFI fuel injector 170 may be included in the intake manifold 146. In some examples, either a CFI injector or PFI injectors may be included in the engine 10. Thus, although both PFI and CFI injectors are shown in the example of FIG. 1, it should be appreciated that the engine 10 may include only one of the two types of injectors.

Fuel injector 170 may inject fuel, received from fuel system 8 or from a fuel rail of the direct injector 166, in proportion to the pulse width of signal FPW-3 received from controller 12 via electronic driver 171. As explained in greater detail below with reference to FIG. 2, the fuel injector 170 may receive LPG that has vaporized and become gaseous. Thus, the fuel injector 170 may inject gaseous LPG. Note that a single electronic driver 167 or 169, or 171 may be used for all fuel injection systems, or multiple drivers, for example two or more of electronic drivers 167, 169, and 171 may be employed to inject fuel. For example, electronic driver 167 may be used for fuel injector 166, electronic driver 169 for fuel injector 168, and electronic driver 171 for fuel injector 170 as depicted.

In an alternate example, two or more of fuel injectors 166, 168, and 170 may be configured as direct fuel injectors for injecting fuel directly into cylinder 14. In still another example, two or more of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by one or more of the injectors 166, 168, and 170 to the cylinder 14 during a single cycle of the cylinder 14. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

In some examples the injectors 166, 168, and 170 may only inject a single type of fuel (e.g., liquid or vapor) of, for example, LPG. However, in other examples, the injectors 166, 168, and 170 may inject different types or phases (e.g., gaseous and/or vapor) of fuel, depending on engine operating conditions. For example, the injectors 166, 168, and 170 may alternate back and forth between injecting a first fuel type (e.g., gaseous LPG) and a second fuel type (e.g., liquid LPG). In such examples, the injectors 166, 168, and 170 may inject only one type of fuel per injection cycle. However, in other examples, the injectors 166, 168, and 170 may inject multiple types of fuel in a given injection cycle. Injector 166 may inject the same type of fuel for a given injection cycle as injector 170 and/or injector 168. However, in other examples, the injector 166 may inject a different type of fuel for a given injection cycle than injector 170 and/or injector 168. For example, injector 166 may inject liquid LPG, while injectors 168 and/or injector 170 may inject gaseous LPG.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166, 168, and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170, 168, and 166, different effects may be achieved.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Figure 2:
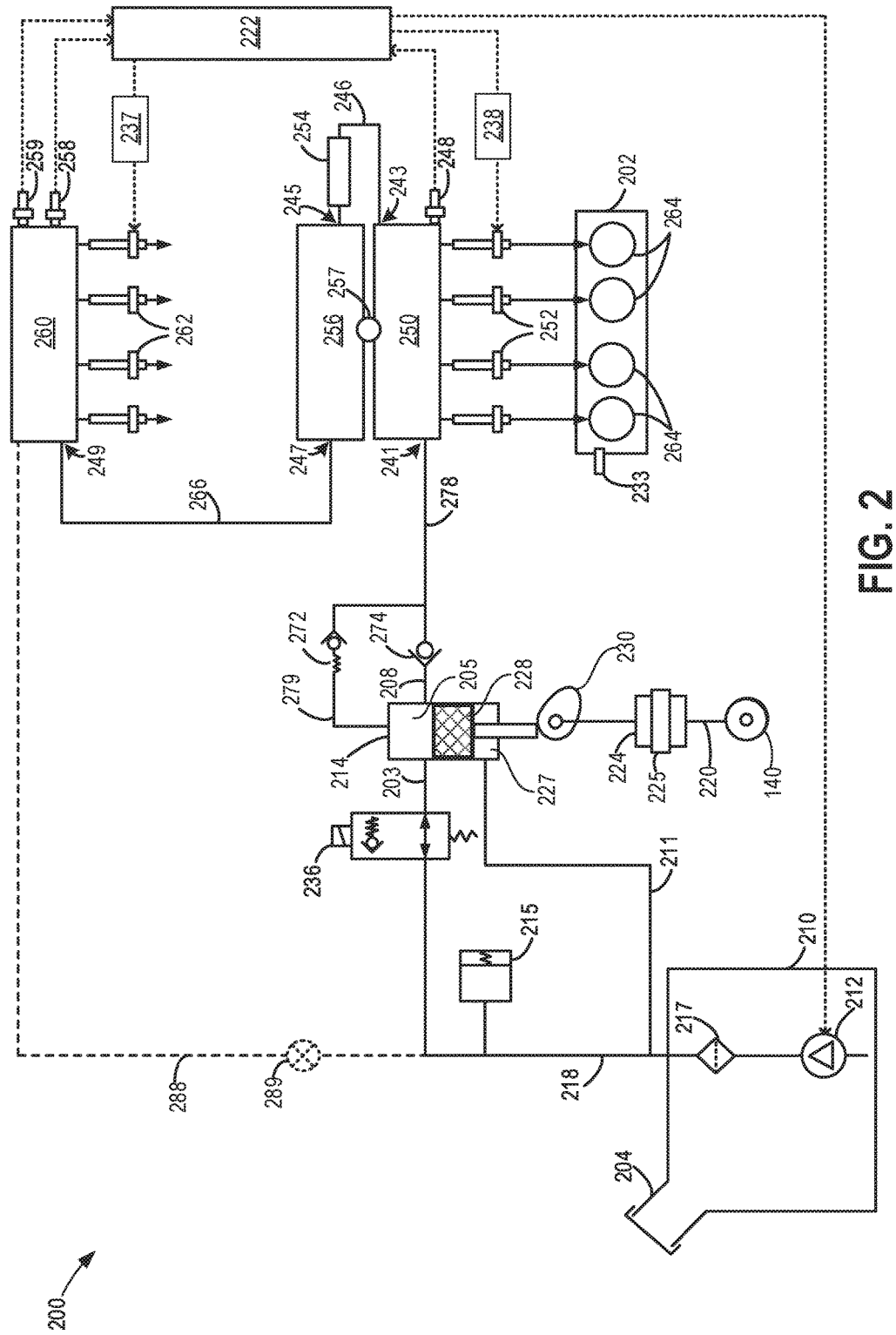
FIG. 2 shows an example embodiment of the fuel system of FIG. 1, in accordance with an embodiment of the present disclosure.

FIG. 2 schematically depicts an example fuel system 200 which may be the same or similar to fuel system 8 described above with reference to FIG. 1. Thus fuel system 200 may be included in an engine system, such as engine system 10 described above with reference to FIG. 1. The fuel system 200 may be configured to directly inject liquefied petroleum gas (LPG) via direct injectors, and in gaseous form via port injectors. However, it should be appreciated that the fuel system 200 may additionally or alternatively inject fuels other than LPG, such as diesel, gasoline, ethanol, biofuels, etc., as well as knock suppression fluids such as water. A higher pressure pump (HPP) is either not included in the fuel system 200, or is rendered inactive while supplying LPG to the engine, so that low pressure direct injection of LPG may be achieved and impairment to the HPP that would otherwise occur due to LPG vaporization at the HPP inlet while running the HPP, may be reduced. Fuel system 200 may be operated by a controller 222, which may be the same or similar to controller 12 of FIG. 1, to perform some or all of the operations described below with reference to the example routines in FIGS. 3 and 4.

Fuel system 200 includes a fuel tank 210, a lift pump 212, a direct injection (DI) fuel rail 250, a port fuel injection (PFI) fuel rail 260, and an engine block 202. Lift pump 212 may also be referred to herein as lower pressure pump (LPP) 212. Thus the fuel system 200 may be configured as a port fuel direction injection (PFDI) system that includes both the direct injection (DI) fuel rail 250, and the port fuel injection (PFI) fuel rail 260. The fuel tank 210 and lift pump are positioned upstream of the DI fuel rail 250.

Fuel tank 210 stores the fuel on-board the vehicle. In some examples, the fuel system 200 may include more than one fuel tank to hold different types of fuel. In one example, the fuel tank 210 may include liquefied petroleum gas (LPG). The LPG may include propane and/or butane. The LPG may additionally or alternatively include other natural gasses and mixtures of flammable hydrocarbon gasses that have been liquefied. However, the fuel tank 210, and/or additional fuel tanks not shown in FIG. 2, may include additional types of fuel such as gasoline, diesel, alcohols, etc. As another example, the alcohol (e.g. methanol, ethanol) may have water added to it. As a specific non-limiting example, fuel may include gasoline and ethanol, (e.g., E10, and/or E85). Fuel may be provided to fuel tank 210 via fuel filling passage 204. The fuel tank 210 may include a pressure sensor and/or a temperature sensor for estimating a fuel tank pressure and/or fuel tank temperature, respectively.

LPP 212 may be disposed at least partially within the fuel tank 210, and may be an electrically-powered fuel pump. LPP 212 may be operated by controller 222 (e.g., controller 12 of FIG. 1) to provide fuel to one or more of the fuel rails 250 and 260. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller 222 may send signals to the lift pump 212, and/or to a power supply of the lift pump 212, to reduce the electrical power that is provided to lift pump 212. By reducing the electrical power provided to the lift pump 212, the volumetric flow rate and/or pressure increase across the lift pump may be reduced. Conversely, the volumetric flow rate and/or pressure increase across the lift pump may be increased by increasing electrical power provided to the lift pump 212. As one example, the electrical power supplied to the lower pressure pump motor can be obtained from an alternator or other energy storage device on-board the vehicle (not shown), whereby the control system can control the electrical load that is used to power the lower pressure pump.

A filter 217 may be disposed downstream of the lift pump 212, and may remove small impurities contained in the fuel that could potentially damage fuel handling components. The lift pump 212 pumps fuel from the fuel tank 210 to the low pressure first passage 218. From the first passage 218, fuel may then flow towards the DI fuel rail 250. In some examples, a HPP 214 may be included upstream of DI fuel rail 250, between the lift pump 212 and the DI fuel rail 250.

When included in the fuel system 200, HPP 214 may be an engine-driven, positive-displacement pump. As one non-limiting example, HPP 214 may be a BOSCH HDP5 HIGH PRESSURE PUMP. The HPP 214 may utilize a solenoid activated control valve (e.g., fuel volume regulator, magnetic solenoid valve, etc.) 236 to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from either the engine crankshaft 140 or a cam shaft via cam 230, thereby operating the HPP according to the principle of a cam-driven single-cylinder pump. Thus, cam 230 may be mechanically coupled to the crankshaft 140 or a cam shaft via a mechanical linkage 220, such as a shaft, chain, belt, etc. A sensor (not shown in FIG. 2) may be positioned near cam 230 to enable determination of the angular position of the cam (e.g., between 0 and 360 degrees), which may be relayed to controller 222.

In such examples where the HPP 214 is included in the fuel system 200, fuel may flow into the HPP 214 via an inlet line 203, and may exit the HPP 214 via an outlet line 208. Thus, fuel may flow through the HPP 214 en route to the fuel rail 250, when the HPP 214 is included in the fuel system 200. However, even in examples where the HPP 214 is included in the fuel system 200, a HPP bypass passage 226 may be included to route fuel around the HPP when supplying LPG to the fuel rail 250. A check valve 274 and/or a pressure relief valve 272 may be positioned between the outlet line 208 of the HPP 214 and the DI fuel rail 250. Pressure relief valve 272 may be arranged parallel to check valve 274 in bypass passage 279 and may limit the pressure in DI supply line 278, located downstream of HPP 214 and upstream of DI fuel rail 250. For example, pressure relief valve 272 may limit the pressure in DI supply line 278 to an upper threshold pressure (e.g., 200 bar). As such, pressure relief valve 272 may limit the pressure that would otherwise be generated in DI supply line 278 if control valve 236 were (intentionally or unintentionally) open and while high pressure fuel pump 214 were pumping. In some examples, the HPP 214 may include a leak path that permits a small flow rate of fuel from bypass passage 279 to bypass passage 211.

Further, when HPP 214 is included in the fuel system 200, the fuel system 200 may optionally further include accumulator 215. When included, accumulator 215 may be positioned downstream of lower pressure fuel pump 212 and upstream of higher pressure fuel pump 214, and may be configured to hold a volume of fuel that reduces the rate of fuel pressure increase or decrease between fuel pumps 212 and 214. For example, accumulator 215 may be coupled in low pressure first passage 218, as shown, or in a bypass passage 211 coupling low pressure first passage 218 to the step-room 227 of HPP 214. In other embodiments, accumulator 215 may inherently exist in the compliance of fuel filter 217 and low pressure first passage 218, and thus may not exist as a distinct element. Alternatively, the accumulator 215 may be sized to be the approximate size of the pump displacement. In other words, as fluid is expelled upstream from chambers 227 or 205, the fluid may collect in accumulator 215 while minimizing the pressure change in lines 218, 211, and/or 203.

In examples where the HPP 214 is included in the fuel system 200, the HPP 214 may either be permanently deactivated, or it may be temporarily deactivated. For example, when the fuel system 200 only includes LPG for fuel, and is only refilled with LPG, the HPP 214 may be permanently deactivated so that it never pressurizes the LPG fuel supplied to one or more of the fuel rails 250 and 260. However, in other examples where the fuel system 200 alternates between injecting LPG and injecting another fuel type, and/or is refilled with both LPG and another fuel type, the HPP 214 may only be deactivated while LPG is being supplied to the one or more fuel rails 250 and 260. Thus, HPP operation (activated or deactivated) may depend on the type of fuel being supplied to the fuel rail 250 and 260. That is, the HPP 214 may be activated while the lift pump 212 is supplying a fuel other than LPG, such as gasoline fuel, to the fuel rail 250. Thus, the HPP 214 is deactivated while LPG is being supplied to one or more of the fuel rails 250 and 260. When activated, the HPP 214 increases the pressure of fuel supplied to the DI fuel rail 250 above the pressure at which the fuel is pumped by the LPP 212, and when deactivated, the HPP 214 does not add pressure to the fuel received from the lift pump 212 and supplied to one or more of the fuel rails 250 and 260.

When the HPP 214 is activated, controller 222 may be configured to regulate fuel flow into HPP 214 through control valve 236 by energizing or de-energizing the control valve 236 (based on the solenoid valve configuration) in synchronism with the driving cam 230. Piston 228 may reciprocate up and down. HPP 214 is in a compression stroke when piston 228 is traveling in a direction that reduces the volume of compression chamber 205. HPP 214 is in a suction stroke when piston 228 is traveling in a direction that increases the volume of compression chamber 205.

Accordingly, when the HPP 214 is activated, the solenoid activated control valve 236 may be operated such that the HPP 214 increases the fuel pressure. For example, the valve 236 may be opened during the suction stroke of the piston 228, and then may be closed during the compression stroke of the piston 228, so that the piston 228 pressurizes the fuel introduced into the compression chamber 205 during the suction stroke. In this way, fuel supplied from the lift pump 212 may be received in the compression chamber 205 during the suction stroke by opening the valve 236, and the fuel may then be further pressurized and pumped to the DI fuel rail 250 by closing the check valve 236 during the compression stroke of the piston 228. Controller 222 may adjust the position of the control valve 236 by adjusting a command signal and/or amount of electrical power supplied to the control valve 236. For example, the controller 222 and control valve 236 may be electrically coupled, and the controller 222 may adjust operation of the control valve 236 by adjusting a pulse width of the command signal generated by the controller and/or adjusting the duty cycle of the electrical power supplied the control valve.

Deactivating the HPP 214 comprises rendering the HPP 214 inactive such that it does not does not add pressure to the fuel pumped out of the tank 210 by the lift pump 212. This may be achieved by, for example, not providing power to the control valve 236 of the HPP 214, and thereby maintaining the control valve 236 in an open position. Thus, the control valve 236 may remain open and may not be closed, so that fuel may flow through the valve 236 (upstream and downstream of the valve 236) during both the suction and compression strokes of the piston 228.

In another example, deactivating the HPP 214 may be achieved by decoupling the HPP 214 from its power source. As one example, where the HPP 214 is a mechanically driven pump that is powered by the crankshaft 140, a clutch or other disconnect mechanism 224 may be included between the HPP 214 and the crankshaft 140, to decouple the HPP 214 from the crankshaft 140. The controller 222 may be in electrical communication with an actuator 225 of the disconnect mechanism 224 to adjust the position of the disconnect mechanism 224 to either couple or decouple the HPP 214 from the source of mechanical energy (e.g., crankshaft 140). Thus, the controller 222 may adjust the electrical signal (e.g., pulse width) sent to the actuator 225 of the disconnect mechanism 224 to adjust the disconnect mechanism 224 to an engaged first position where the HPP 214 is coupled to the power source (e.g., crankshaft 140) or to a disengaged second position where the HPP 214 is decoupled from the power source. The actuator may comprise, as an example, an electromagnetic coil.

In yet another example, the HPP 214 may be manually deactivated by, for example, manually disconnecting the HPP 214 from its power source or inhibiting rotation of the cam 230.

In yet another example, the HPP 214 may simply be omitted/removed from the fuel system 200, and thus may not be included in the fuel system 200. In such examples where the HPP 214 is removed/omitted from the fuel system 200, the only pump the fuel system 200 may include is the LPP 212. When the HPP 214 is omitted/removed from the fuel system 200, a single, continuous fuel supply line may couple the lift pump 212 to the DI fuel rail 250. Thus, fuel may be supplied directly to the DI fuel rail 250 from the lift pump 212 via passage 218, without flowing through a higher pressure pump or other passage. Further, the lift pump 212 pumps LPG directly to the DI fuel rail 250, and does not pump LPG directly to the PFI fuel rail 260 without first flowing the LPG into the DI fuel rail 250. Thus, when fueling the engine with LPG, the LPG must flow at least partially through the DI fuel rail 250 before flowing to the PFI fuel rail 260.

Fuel may enter the DI fuel rail 250 at an inlet end 241 of the fuel rail 250. Fuel rail 250 may include a first fuel rail pressure sensor 248 for providing an indication of the fuel pressure in the fuel rail 250. Thus, controller 222 may estimate and/or determine the fuel rail pressure (FRP) of the DI fuel rail 250 based on outputs received from the first fuel rail pressure sensor 248. Further, the controller 222 may adjust operation of the lift pump 212 based on the FRP determined from the pressure sensor 248. For example, the controller 222 may adjust an amount of electrical power supplied to the lift pump 212 by adjusting for example, a pulse width of a command signal, based on a difference between the estimated FRP and a desired FRP. The desired FRP or set point may be lower when supplying LPG to the fuel rail 250, than when supplying another type of fuel, such as gasoline. That is, the desired pressure of the DI fuel rail may be lower when fueling the engine with LPG than when fueling the engine with another type of fuel where activation of the DI pump 214 is required.

The controller 222 may feedback control operation of the lift pump 212 to the desired pressure of the DI fuel rail 250. When fueling with LPG, the DI pump 214 is inactive, and thus fuel is pumped to the DI fuel rail 250 by only the lift pump 212. The lift pump 212 may only be capable of pressurizing the LPG to a certain pressure. Thus, the lift pump 212 may have a maximum pressure to which it can raise the pressure of the LPG. As such, when fueling with LPG, the desired pressure of the DI fuel rail 250 may not exceed the maximum pressure of the lift pump 212, which may be the outlet pressure of the lift pump 212. Thus, the desired pressure of the DI fuel rail 250 when supplying the DI fuel rail 250 with LPG may be approximately the same as, or less than, the outlet pressure of the lift pump 212.

The fuel rail 250 may additionally include a temperature sensor, such as temperature sensor 259, for estimating a temperature of the fuel rail 250. Thus, the controller 222 may estimate a temperature of the fuel rail 250 based on outputs from the temperature sensor included in the fuel rail 250.

The DI fuel rail 250 dispenses fuel to the DI fuel injectors 252, each of which are disposed at least partially within one of the cylinders 264 for injecting fuel into the cylinders 264. Controller 222 can individually actuate each of the direct injectors 252 via a direct injection driver 238. An engine speed sensor 233 can be used to provide an indication of engine speed to the controller 222. The indication of engine speed can be used to identify the speed of higher pressure fuel pump 214, since the pump 214 may be mechanically driven by the engine 202, for example, via the crankshaft or camshaft.

A first PFI supply line 246 may be coupled on a first end to an outlet end 243 of the DI fuel rail 250, and on an opposite second end to an inlet end 245 of a DI fuel rail cooling chamber 256. The outlet end 243 of the DI fuel rail 250 may be positioned near a top 261 (with respect to the ground in an on-road vehicle) of the DI fuel rail 250 where vapor accumulates if fuel in the DI fuel rail 250 vaporizes. Thus, the PFI supply line 246 may be coupled to the DI fuel rail 250 at a location of the DI fuel rail 250 where gaseous LPG accumulates, if it exists at all in the DI fuel rail 250.

The DI fuel rail cooling chamber 256 therefore, may include gaseous LPG received from the DI fuel rail 250 that is at a lower pressure and temperature than the DI fuel rail 250. The cooling chamber 256 is in thermal contact with the DI fuel rail 250 to cool (reduce the temperature of) the DI fuel rail 250. In this way, the DI fuel rail 250 may transfer heat to the LPG in the cooling chamber 256, thereby heating the cooling chamber 256 and enhancing vaporization of the LPG in the cooling chamber 256. In this way, the PFI fuel rail 260 may be supplied with only gaseous LPG by the DI fuel rail 250. However, in other examples, the PFI rail may receive some liquid LPG from the DI fuel rail 250. Further, by cooling LPG in the DI rail with the vaporized LPG in the cooling chamber 256, the cooling chamber 256 may ensure that only liquid LPG exists in the DI fuel rail 250.

In one example, the cooling chamber 256 may be positioned exterior to the DI fuel rail 250, near or in face sharing contact with the DI fuel rail 250, such that heat from the DI fuel rail may be transferred to the cooling chamber 256. A thermally conductive element 257 may be positioned between and physically coupled to the cooling chamber 256 and the DI fuel rail 250 to transfer heat there-between. In examples where the cooling chamber 256 and DI fuel rail 250 are in face-sharing contact with one another, as shown in the example of FIG. 2, the thermally conductive element 257 may be integrated within the walls of the cooling chamber 256 and DI fuel rail 250 that are in face-sharing contact with one another. In another example, the cooling chamber 256 may be included within the DI fuel rail 250.

A pressure regulator 254 may be included in the fuel system 200 to maintain the pressure of the cooling chamber 256 and PFI fuel rail 260 at a lower pressure than the DI fuel rail 250, and to eject gaseous LPG from the DI fuel rail 250. Thus, the pressure regulator 254 may ensure that only liquid LPG exists in the DI fuel rail 250, by ejecting vapor from the DI fuel rail 250 when liquid fuel in the DI fuel rail 250 vaporizes. The pressure regulator 254 may comprise a fully mechanical regulator. In other examples, the pressure regulator 254 may be constructed from an injector and pressure sensor within cooling chamber 256. Additionally, the pressure regulator 254 may maintain the pressure of the DI fuel rail 250 at the desired injection pressure. In some examples, the pressure regulator may be a passively controlled device.

However, in other examples, the controller 222 may actively control the pressure regulator 254 to maintain the pressure of the PFI fuel rail 260 below that of the DI fuel rail 250, while maintaining the DI fuel rail 250 at its desired pressure. Thus, the controller 222 may be electrically coupled to the pressure regulator 254 and may adjust operation of the pressure regulator 254 by adjusting a command signal sent to the pressure regulator 254, for example, a pulse width of the command signal.

In such examples where the pressure regulator 254 is actively controlled, the pressure regulator 254 may comprise an injector. As such, pressure regulator 254 may also be referred to herein as injector 254. The injector 254 may be a normally closed injector that is biased towards a closed position. In the closed position, no LPG flows through the injector 254. Thus, the injector 254 may only open when it is desired to supply LPG from the DI fuel rail 250 to the PFI fuel rail 260. If the LPG supplied to the injector 254 has not already been vaporized, the LPG may vaporize upon injection to the cooling chamber 256 due to the reduced pressure in the cooling chamber 256 as compared to the pressure of the DI fuel rail 250. Thus, the controller 222 may inject LPG from the DI fuel rail 250 into the cooling chamber 256 via the injector 254. The controller may adjust the position of the injector 254 by, for example, adjusting a pulse-width of a command signal sent to the injector 254. The controller may estimate the phase of the LPG in one or more of the DI fuel rail 250, cooling chamber 256, and PFI fuel rail 260 based on the temperature and pressure of the respective components. Specifically, the controller may compare the estimated temperature and pressure of the LPG to a known liquid-gas phase change curve for LPG, an example of which is shown below in FIG. 5.

The pressure regulator 254 may in some examples be included at the outlet end 243 of the DI fuel rail 250. However in other example, the pressure regulator 254 may be included in the PFI supply line 246. In yet another example, the pressure regulator 254 may be included at the inlet end 245 of the cooling chamber 256. The pressure regulator 254 may be controlled to maintain the pressure downstream of the regulator 254 (e.g., cooling chamber 256, PFI fuel rail 260, etc.) below the pressure upstream of the regulator 254 (DI fuel rail 250) by a threshold amount. The threshold amount may comprise, for example, 10 PSI. In this way the PFI fuel rail 260 may be maintained at a lower pressure than the DI fuel rail 250. However, the controller 222 may coordinate operation of the lift pump 212 and injector 254 so that LPG from the DI fuel rail 250 can be supplied to the PFI fuel rail 260, while maintaining the desired pressure of the DI fuel rail 250.

From the cooling chamber 256, gaseous LPG may be routed to the PFI fuel rail 260 via a second PFI supply line 266. The PFI supply line 266 may be coupled on a first end to an outlet end 247 of the cooling chamber 256, and on an opposite second end to an inlet end 249 of the PFI fuel rail 260. Thus, any LPG discharged from the DI fuel rail 250 that is not discharged to the DI fuel injectors 252, is routed to the PFI fuel rail 260 via the PFI supply lines 246 and 266.

The PFI fuel rail 260 dispenses fuel to the port injectors 262 via a port injection driver 237. Each of the port injectors 262 may be positioned within an intake port (e.g., intake duct 147 described above in FIG. 1) of one of cylinders 264 for injecting fuel into the intake ports. While each of the DI fuel rail 250 and PFI fuel rail 260 are shown dispensing fuel to four fuel injectors of the respective injectors 252, 262, it will be appreciated that each fuel rail 250 and 260 may dispense fuel to any suitable number of fuel injectors. As one example, DI fuel rail 250 may dispense fuel to one fuel injector of first injectors 252 for each cylinder of the engine while PFI fuel rail 260 may dispense fuel to one fuel injector of second injectors 262 for each cylinder of the engine. The controller 222, drivers 237 and 238, and other suitable engine system controllers can comprise a control system. While the drivers 237, 238 are shown external to the controller 222, it should be appreciated that in other examples, the controller 222 can include the drivers 237, 238 or can be configured to provide the functionality of the drivers 237, 238. Controller 222 may include additional components not shown, such as those included in controller 12 of FIG. 1.

In another embodiment, the fuel system 200 may include a central fuel injection (CFI) injector (e.g., CFI fuel injector 170 described above in FIG. 1) instead of, or in addition to, the PFI fuel rail 260 and port injectors 262 to inject fuel into a common intake manifold (e.g., intake manifold 146 described above in FIG. 1), rather than the distinct intake ducts. In such an example, LPG from the cooling chamber 256, may be routed to the CFI injector via the second PFI supply line 266. Thus, the PFI supply line 266 may be coupled on the first end to an outlet end 247 of the cooling chamber 256, and on the opposite second end to the CFI injector, instead of the PFI fuel rail 260. Thus, any LPG discharged from the DI fuel rail 250 that is not discharged to the DI fuel injectors 252, may be routed to the CFI injector.

In yet further examples, both the CFI fuel injector, and the PFI fuel rail 260 including the port injectors 262, may be included in the fuel system 200. In such examples, the PFI supply line 266 may split and deliver fuel from the DI fuel rail 250 to each of the CFI injector and PFI fuel rail 260 separately.

The CFI injector may be coupled to the intake manifold at a position upstream of the intake ducts. That is the CFI injector may be coupled to the intake at a position upstream of where the common intake manifold before the manifold splits into the distinct intake ducts. Thus, the CFI injector may inject fuel into the engine intake at a position of the intake where the injected fuel may then feed into any one of the intake ducts and associated engine cylinders.

The PFI fuel rail 260 may additionally include a pressure sensor 258 and a temperature sensor 259. The controller 222 may estimate a pressure of the PFI fuel rail 260 based on outputs received from the pressure sensor 258 and a temperature of the PFI fuel rail 260 based on outputs received from the temperature sensor 259. Thus, the pressure sensor 258 and temperature sensor 259 may be electrically coupled to the controller 222.

The controller 222 may adjust operation of the injector 254 based on the estimated pressure and/or temperature of the PFI fuel rail 260. For example, the controller may adjust operation of the injector 254 to maintain the PFI fuel rail 260 at a desired pressure. For example, the controller 222 may adjust operation of the injector 254, for example, a pulse width of a command signal, based on a difference between the estimated FRP of the PFI fuel rail 260 and a desired FRP for the PFI fuel rail. Thus, the controller 222 may reduce the amount of LPG injected by the injector 254, and therefore supplied to the PFI fuel rail 260 when the measured PFI fuel rail pressure is greater than desired, and may increase the amount of LPG injected by the injector 254 to increase the amount of LPG supplied to the PFI fuel rail 260 when the PFI fuel rail pressure is less than desired. The desired FRP or set point may depend on the intake duct pressure, where the desired FRP may be higher for higher intake duct pressures.

In one embodiment, where the HPP 214 is included in the fuel system 200, a low pressure second passage 288 may optionally be included to route fuel directly from the lift pump 212 to the PFI fuel rail 260, without flowing the fuel through the DI fuel rail 250. For example, when LPG upstream of the HPP 214 is gaseous or is close to vaporizing, the controller 222 may open a valve 289 positioned in the second passage 288 to route the LPG directly to the PFI fuel rail 260. Further, the controller 222 may close the valve 236 while holding the valve 289 open, to only permit fuel to flow to the PFI fuel rail 260, when only port injection is desired. In another example, the controller 222 may open the valve 289 when fueling the engine with a fuel other than LPG, such as gasoline. Thus, when supplying gasoline, diesel, or another fuel that requires activation of the HPP 214 for direct injection, the second passage 288 may be included for port injection of fuel that has not been pressurized by the HPP 214.

Thus, the fuel system 200 does not include a fuel return line from either of the fuel rails 250 or 260. Thus, once pumped out of the fuel tank 210 by the lift pump 212, fuel does not return to the fuel tank 210, unless it returns to the fuel tank 210 from a point in the fuel system 200 upstream of both of the fuel rails 250 and 260. Fuel therefore, is either injected directly into engine cylinders 264 via direct injection (DI) fuel injectors 252 or is injected into one or more intake ports via port fuel injection (PFI) fuel injectors 262 once it reaches one of the fuel rails 250 and 260. In another example, the engine may additionally or alternatively include one or more central fuel injection (CFI) injectors for injecting fuel into an intake manifold or intake passage. Fuel may be supplied directly to the CFI injectors from the fuel rail 250 without being returned to the fuel tank 210. Fuel therefore may be supplied to the engine cylinders 264 by one or more of: directly injecting fuel into the one or more engine cylinders 264 via the DI fuel injectors 252, port injecting fuel into the intake ports of the engine cylinders 264 via the PFI injectors 252, and injecting fuel into the intake manifold or intake passage of the engine via one or more CFI injectors.

Further, when supplying LPG to the fuel rails 250 and 260, the DI fuel rail 250 and PFI fuel rail 260 are coupled in series with one another in the fuel system 200, such that fuel must flow through one of the fuel rails 250 or 260 before flowing to the other. In the example of FIG. 2, the DI fuel rail 250 is positioned upstream of the PFI fuel rail 260, such that fuel pumped from the tank 210 flows first to the DI fuel rail 250.

Under some conditions, at least a portion of the fuel pumped to the DI fuel rail 250 may then be supplied directly to the PFI fuel rail 260 from the DI fuel rail 250. For example, when liquid LPG vaporizes such that gaseous LPG exists in the DI fuel rail 250, at least a portion of that gaseous LPG may be supplied to the PFI fuel rail 260. In other examples, liquid LPG may vaporize when injected from the DI fuel rail to the PFI fuel rail due to the lower pressure of the PFI fuel rail. However, it should be appreciated that during other engine operating conditions fuel may not flow from the DI fuel rail 250 to the PFI fuel rail 260. In such examples, all of the fuel supplied to the DI fuel rail 250 by the lift pump 212 may remain in the DI fuel rail 250 and/or may be injected to engine cylinders 264 before the fuel can reach the PFI fuel rail 260.

When flowing from the DI fuel rail 250 to the PFI fuel rail 260, fuel does not return to the fuel tank 210, but instead flows directly from the DI fuel rail 250 to the PFI fuel rail 260. Thus, any fuel flowing out of the DI fuel rail 250, flows to the PFI fuel rail 260 directly, and does not return to any portion of the fuel system 200 (including the fuel tank 210) positioned upstream of the DI fuel rail 250. As such, PFI fuel rail 260 is supplied fuel only from the DI fuel rail 250. In this way, fuel flow in the fuel system 200 is unidirectional, from the fuel tank 210 to the DI fuel rail 250, and then in some examples on to PFI fuel rail 260. Thus, heating of the fuel tank 210 may be reduced and an amount of plumbing in the fuel system 200 may be reduced by eliminating fuel return lines.

Controller 222 may control the operation of each of the injectors 252 and 262. For example, controller 222 may control the distribution and/or relative amount of fuel delivered from each injector, which may vary with operating conditions, such as engine load, knock, and exhaust temperature. Specifically, controller 222 may adjust a direct injection fuel ratio by sending appropriate signals to port fuel injection driver 237 and direct injection 238, which may in turn actuate the respective port fuel injectors 262 and direct injectors 252 with desired pulse-widths for achieving the desired injection ratios. Additionally, controller 222 may selectively enable and disable (i.e., activate or deactivate) one or more of the injectors 252 and 262 based on fuel pressure within each rail. An example control scheme of the controller 222 is shown below with reference to FIG. 3.

Figure 3:
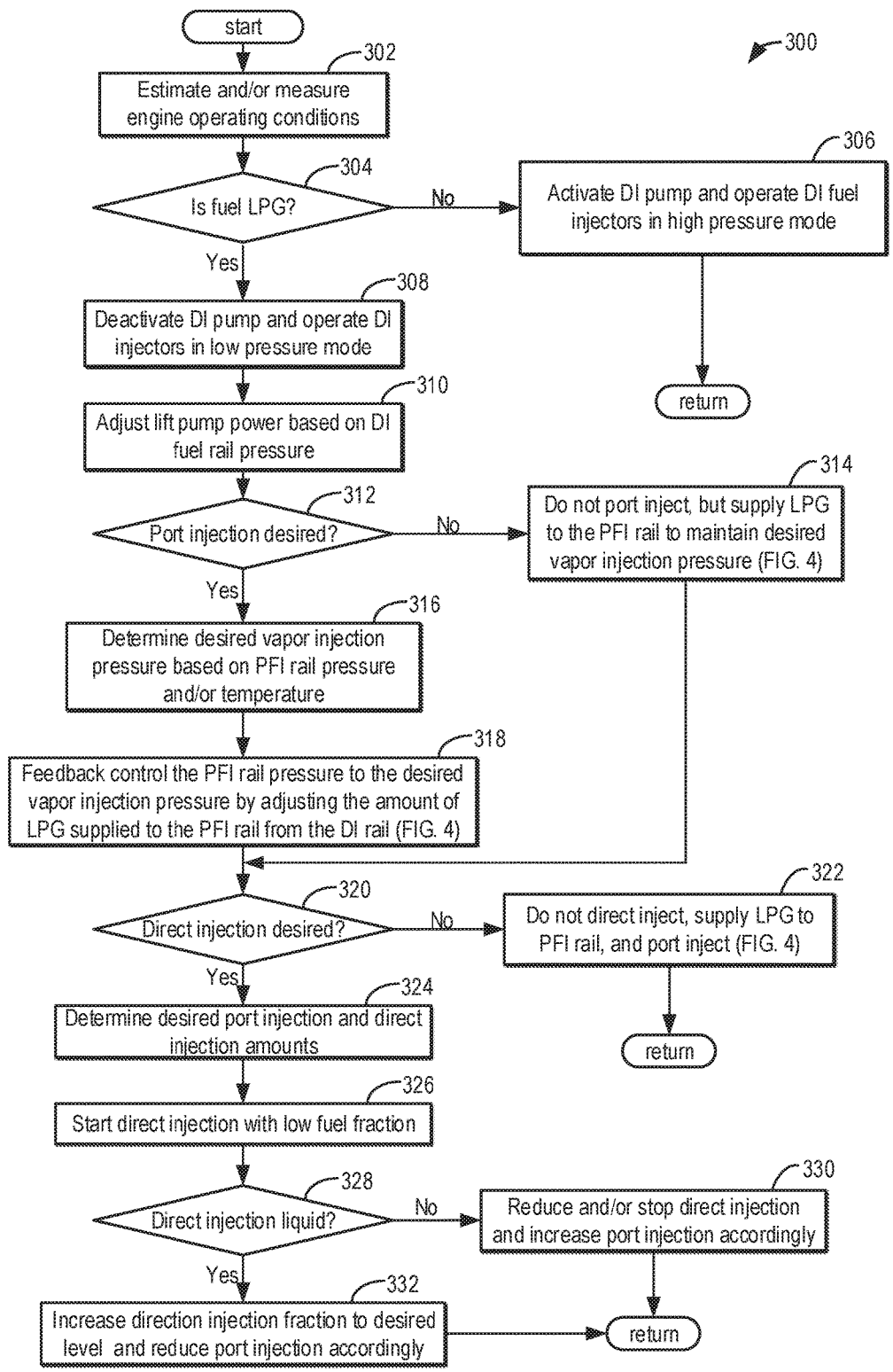
FIG. 3 shows a flow chart of an example method for fueling an engine, such as the engine system of FIG. 1, with LPG, in accordance with an embodiment of the present disclosure.
Figure 4:
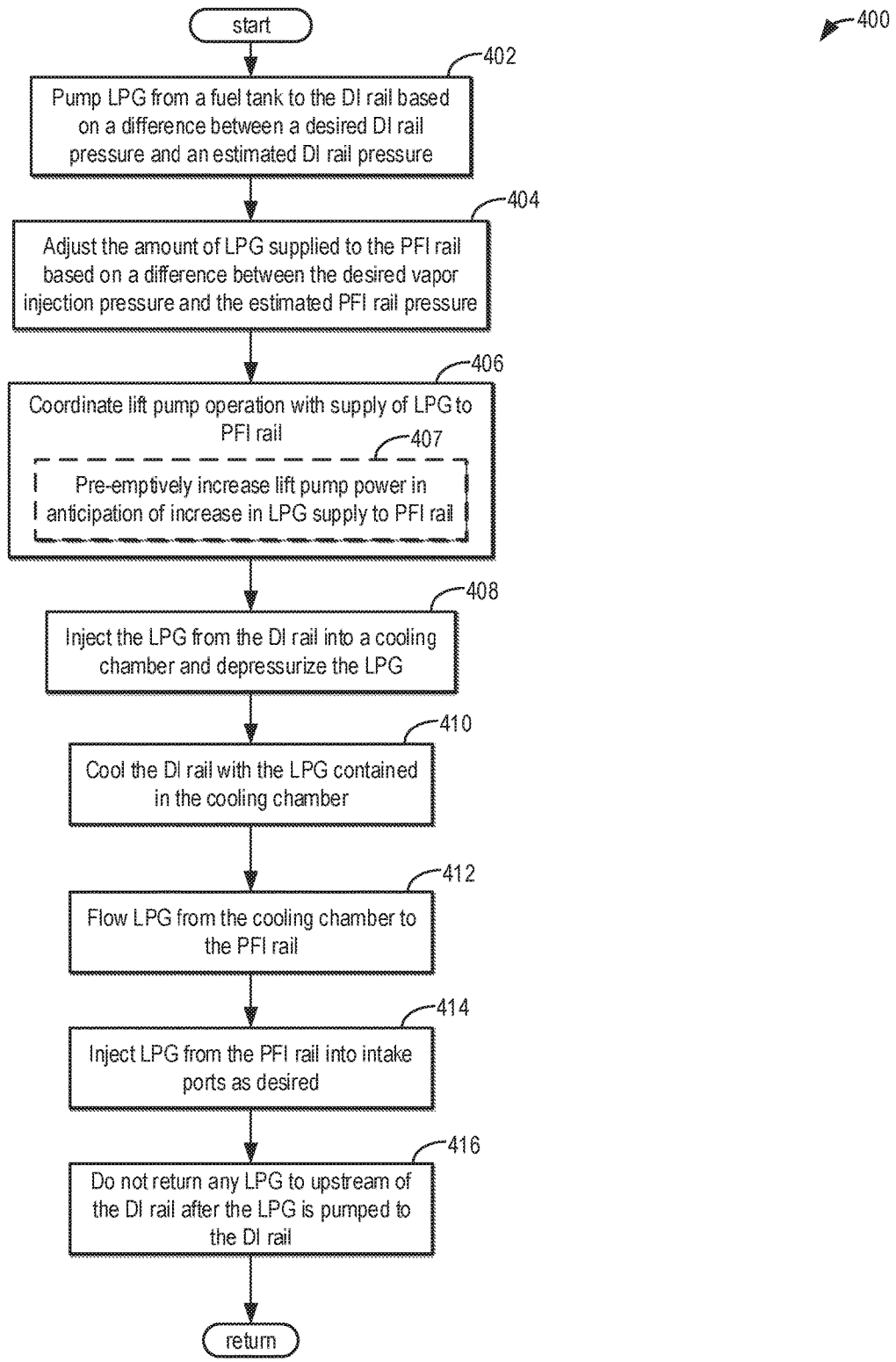
FIG. 4 shows a flow chart of an example method for supplying LPG first to a direct injection fuel rail, and then from the direct injection fuel rail to a port fuel injection rail, in accordance with an embodiment of the present disclosure.
Figure 5:
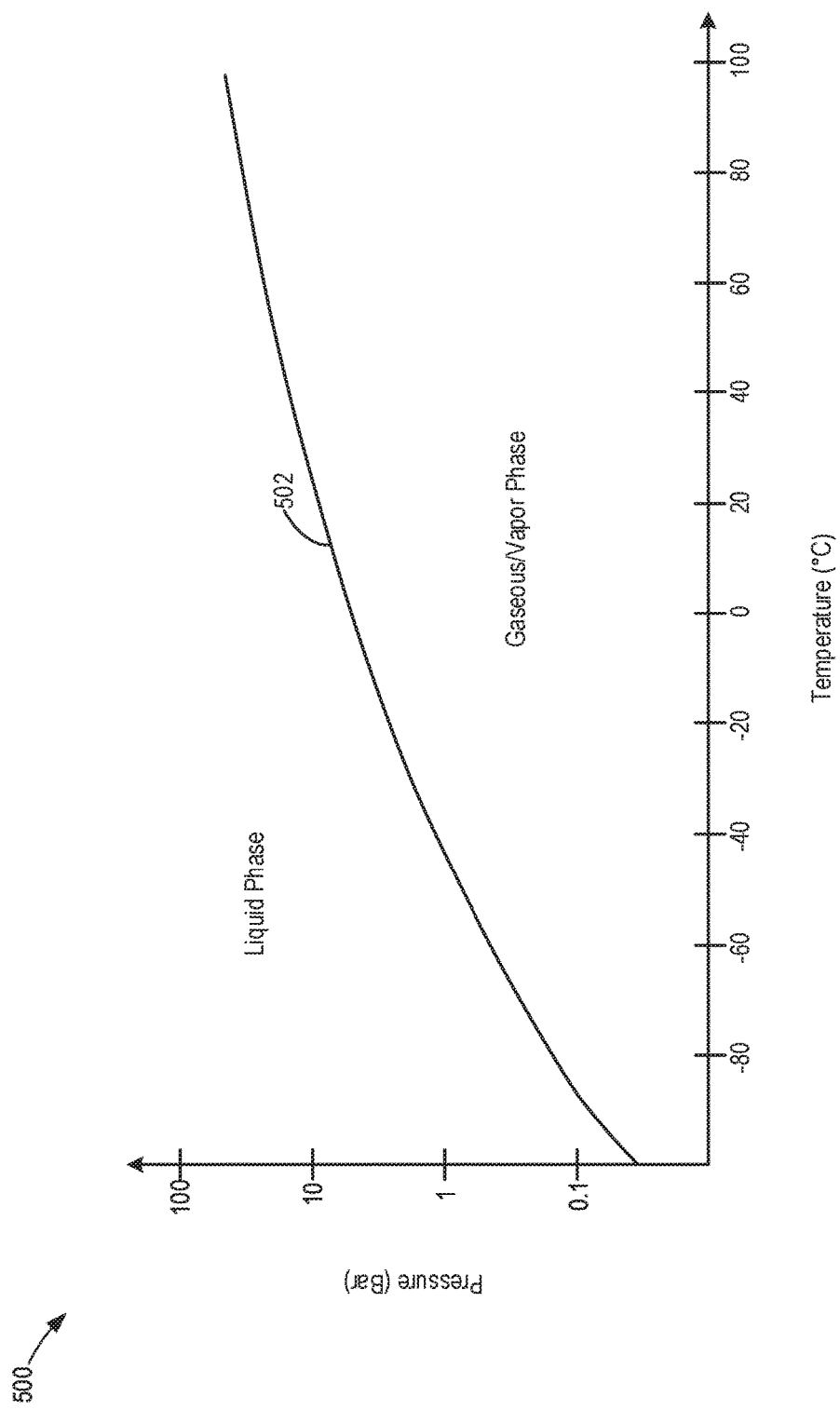
FIG. 5 shows a graph of an example liquid-gas phase change curve for LPG, in accordance with an embodiment of the present disclosure.

Turning to FIGS. 3 and 4, they show flow charts of example methods for operating a fuel system (e.g., fuel system 200 described above in FIG. 2) capable of injecting LPG. A controller, such as controller 12 described above in FIG. 1 and/or controller 222 described above in FIG. 2 may include instructions stored in non-transitory memory for executing the methods described in FIGS. 3 and 4. In particular, the controller may adjust operation of one or more of a lift pump (e.g., lift pump 212 described above in FIG. 2), an LPG vapor injector (e.g., injector 254 described above in FIG. 2), an inlet valve of a DI pump (e.g., control valve 236 of HPP 214 described above in FIG. 2), and one or more fuel injectors (e.g., injectors 252 and 262 described above in FIG. 2 and fuel injectors 166, 168, and 170 described above in FIG. 1) to fuel an engine (e.g., engine 10 described above in FIG. 1) with LPG.

Focusing on FIG. 3, it shows an example method 300 for direct injecting and/or port injecting LPG. At higher fuel rail temperatures and lower fuel rail pressures, where vaporization of LPG is favorable and/or more likely, the method 300 may comprise injecting gaseous LPG into intake ducts via one or more PFI injectors and/or into an intake manifold via one or more CFI injectors. At colder engine or ambient temperatures, where condensation of LPG is favorable and/or more likely, the method 300 may comprise low pressure direct injecting LPG directly into engine cylinders via one or more direct injectors. Thus, the method may comprise port injecting and/or central fuel injecting LPG when gaseous LPG exists in the DI rail. The method may additionally comprise direct injecting when gaseous LPG does not exist in the DI rail. Further, the method may comprise removing gaseous LPG from the DI rail by injecting it into the PFI rail, and waiting to initiate direct injection until substantially all of the gaseous LPG has been removed from the DI rail. The controller may estimate the phase (gaseous or liquid) of the LPG in the fuel rail by comparing the temperatures and pressures of the fuel rails to a liquid-gas phase change curve for LPG, an example of which is shown below in FIG. 5.

In some examples, the method 300 may comprise both low pressure direct injecting and port injecting LPG. In other examples, the method 300 may comprise both low pressure direct injecting and central fuel injecting LPG. In yet further examples, the method 300 may comprise all of direct injecting, port injecting, and central fuel injecting LPG. Further, method 400 in FIG. 4 may comprise self-cooling the DI rail by expelling a portion of the LPG contained in the DI rail, de-pressurizing the expelled LPG and thus cooling the expelled LPG, and then cooling the DI rail with the colder, less pressurized LPG. Cooling the DI rail with the colder, less pressurized LPG also heats the colder, less pressurized LPG, increasing vaporization of the LPG supplied to the PFI or CFI injectors.

Method 300 begins at 302 which comprises estimating and/or measuring engine operating conditions. Engine operating conditions may include one or more of fuel tank temperature, fuel tank pressure, fuel rail temperature, fuel rail pressure, driver demanded torque, engine speed, etc.

Method 300 then continues from 302 to 304 which comprises determining if the fuel for engine fueling is liquid petroleum gas (LPG). In some examples, LPG may be the only on-board fuel, in which case the fuel is LPG and the method 300 continues from 304 to 308. Thus, in examples where the fuel system is configured as an LPG-only fuel system, method 300 may not include step 304, and method 300 may proceed directly from 302 to 308. However, in other examples in which the engine utilizes more than one type of fuel, the method 300 at 304 may comprise determining whether or not LPG fueling is desired. LPG fueling may be desired, for example, when there is more LPG than other fuel types in one or more on-board fuel tanks (e.g., fuel tank 210 described above in FIG. 2).

If LPG is not being used to fuel the engine, method 300 may continue from 304 to 306 which comprises activating the DI pump and operating DI injectors (e.g., DI fuel injectors 252 described above in FIG. 2) in a high pressure mode. Thus, the method 300 at 306 comprises supplying a fuel other than LPG, such as gasoline, to one or more of a DI rail (e.g., DI fuel rail 250 described above in FIG. 2) and a PFI rail (e.g., PFI fuel rail 260 described above in FIG. 2). When supplying the fuel, such as gasoline, to the DI rail, the fuel may be pressurized by the DI pump by activating the DI pump and operating the DI pump in a pressurized mode. As described above in FIG. 2, the DI pump may be activated and operated in the pressurized mode by opening the inlet valve during a suction stroke of the DI pump, and closing the inlet valve during a compression stroke of the DI pump. Thus, the method 300 at 306 comprises adjusting the inlet valve such that the DI pump adds pressure to the fuel supplied to the DI rail by the lift pump.

Further, operating the DI injectors in the high pressure mode may comprise adjusting a set point for the DI rail pressure (e.g., desired DI rail pressure) to a higher first pressure. Thus, the controller may adjust operation of the lift pump and/or inlet valve of the DI pump to maintain the DI rail at the higher first pressure. In this way, fuel may be injected directly into engine cylinders at higher cylinder pressures when fueling the cylinder with a non-LPG fuel than when fueling the cylinders with LPG. Method 300 then returns.

Returning to 304, if LPG is being used to power the engine, method 300 continues to 308 which comprises deactivating the DI pump and operating the DI injectors in a low pressure mode. As described in greater detail above with reference to FIG. 2, deactivating the DI pump comprises operating the DI pump such that it does not add pressure to the LPG supplied to the DI rail. For example, deactivating the DI pump may comprise not supplying electrical power to the inlet valve of the DI pump so that fuel may flow freely through the inlet valve during both suction and compression strokes of the DI pump. Operating the DI injectors in the low pressure mode may comprise adjusting the set point for the DI rail pressure to a lower second pressure. Thus, when injecting LPG, the desired fuel rail pressure may be adjusted to a lower pressure than what would be desired when injecting a fuel other than LPG, such as gasoline. The lower second pressure may be set based on the temperature of the DI rail. In particular, the lower second pressure may be a pressure at which LPG in the DI rail will exist as a liquid for the current DI rail temperature. For example, the lower second pressure may be set to a pressure below the liquid-gas phase change curve for LPG, an example of which is shown in FIG. 5, such that LPG in the DI rail is maintained in a liquid state.

Further, operating the injectors in the low pressure mode comprises feedback controlling the pressure of the DI rail to a pressure lower than would be desired when injecting a fuel other than LPG and/or when the DI pump is active. Specifically, the controller may feedback control operation of the lift pump to a lower pressure than is desired when the DI pump is active and a fuel other than LPG is being supplied to the DI rail. For example, the controller may lower the set point for the DI rail pressure when supplying LPG to the DI rail.

As explained above in FIG. 2, the set point for the DI rail pressure when supplying LPG may not exceed the maximum pressure capabilities of the lift pump. Thus, the set point may be set to below the maximum pressure of the lift pump and/or below the outlet pressure of the lift pump.

In this way, the DI injectors may be operated in the low pressure mode to inject LPG that is at a substantially similar pressure, or lower pressure, than the outlet pressure of the lift pump. The timing of the injection by the DI injectors may be controlled based on the pressure of the DI rail and the in-cylinder pressure of the engine cylinders. Specifically, the DI injectors may wait to inject LPG until the in-cylinder pressure is less than the DI rail pressure. Thus, the controller may inject LPG directly into the engine cylinder when the in-cylinder pressure is less than the outlet pressure of the lift pump, since the DI rail pressure may be feedback controlled to below or up to the outlet pressure of the lift pump.

After setting the desired fuel rail pressure to the lower second pressure, method 300 may continue from 308 to 310 which comprises adjusting lift pump power based on the DI fuel rail pressure. Thus, the controller may adjust the amount of electrical power provided to the lift pump by, for example, adjusting the duty cycle of the electrical power supplied to the lift pump motor to maintain the DI rail pressure at the lower second pressure. As explained above in FIG. 2, the controller may estimate the DI rail pressure via outputs received from a DI rail pressure sensor (e.g., pressure sensor 248 described above in FIG. 2). The controller may then adjust lift pump power based on a difference between the estimated DI rail pressure and the lower second pressure, to bring the DI rail pressure closer to the lower second pressure. The desired DI rail pressure when injecting LPG (e.g., lower second pressure) may be adjusted depending on engine operating conditions such as cylinder pressure, cylinder temperature, fuel temperature, etc.

Method 300 then continues from 310 to 312 which comprises determining if port injection is desired. Port injection may be desired at higher ambient temperatures and/or higher fuel tank temperatures, where LPG vaporization is more likely. In another examples, port injection may be desired at higher DI rail temperatures. For example, port injection may be desired when one or more of the ambient temperature, fuel tank temperature, and DI rail temperature increase above respective first thresholds. The thresholds may be set at, or proximate to, the liquid to gaseous phase change for LPG, which is dependent on pressure and may be determined by a known relationship (e.g., look-up table) relating pressure to LPG liquid-gas phase change temperatures. An example liquid-gas phase change curve is shown in FIG. 5.

Thus, port injection may be desired when liquid LPG in the DI rail is vaporizing or is close to vaporizing, and thus cooling of the DI rail is desired. In this way, port fuel injection and/or central fuel injection are prioritized over direct fuel injection when fluid in the DI rail is close to, or is vaporizing. For example, the method 300 may comprise expelling substantially all of the vapor in the DI rail by ejecting it via the vapor injector before initiating direct injection of LPG. Thus, if the controller determines that vapor exists in the DI rail based on the temperature and pressure of the DI rail, then the controller may open the vapor injector to eject the gaseous LPG from the DI rail, before initiating direct injection of liquid LPG. The fuel system therefore, may port inject LPG to prevent and/or reduce LPG vaporization in the DI rail. Vaporization of LPG in the DI rail may be detected by comparing a measured DI rail temperature (DI temperature measurement obtained from a DI rail temperature sensor) to the liquid-gas phase change temperature of the LPG for the measured DI rail pressure. Additionally or alternatively, it may be desired to port inject when the pressure of the PFI rail is sufficiently less than the DI rail, such that LPG will vaporize when expelled from the DI rail and supplied to the PFI rail. Thus, the method 300 may comprise not direct injecting when vapor exists in the DI rail, or when LPG in the DI rail is close to vaporizing (within a threshold of the liquid-gas phase curve for LPG).

In some examples, it may be desired to port inject even when liquid LPG exists in the PFI rail. The controller may estimate whether or not liquid LPG exists at the PFI rail based on estimates of the PFI rail temperature and pressure obtained from PFI temperature and pressure sensors, respectively (e.g., temperature sensor 259 and pressure sensor 258 described above in FIG. 2). In particular, the controller may determine the liquid-gas phase change temperature for LPG in the PFI rail based on the PFI rail pressure, and a known relationship between pressure and LPG liquid-gas phase change temperature (e.g., a look-up table relating LPG pressure and LPG liquid-gas phase change temperatures).

Further, port fuel injection may be preferred over direct injection because injector noise and pumping work may be reduced by port injecting rather than direct injecting.

However, in other examples it may not be desired to port inject when liquid LPG exists at the PFI rail. Thus, in such examples, the controller may only inject LPG via the port injectors when the LPG is in gaseous form in the PFI rail. For example, the controller may determine whether liquid LPG exists at the PFI rail based on the temperature and pressure of the PFI rail.

If port injection is not desired, method 300 continues from 312 to 314 which comprises not port injecting but supplying LPG to the PFI rail to maintain a desired vapor injection pressure, as is described in greater detail below with reference to FIG. 4. The desired vapor injection pressure may be set based on the PFI rail temperature and the liquid-gas phase change pressure for LPG at the current PFI rail temperature. For example, the vapor injection pressure may be set to less than the liquid-gas phase change pressure for the LPG at the current rail temperature (e.g., a pressure at which LPG exists in liquid form at the current rail temperature). Thus, the controller may estimate the temperature of the PFI rail based on the measurements obtained from the temperature sensor, and may then set the desired PFI rail pressure below the liquid-gas phase change pressure for the measured PFI rail temperature to maintain the LPG in the PFI rail as vapor, and prevent/reduce condensation in the PFI rail. The controller may include a known relationship (e.g., look-up table) stored in non-transitory memory that temperatures and pressures for LPG to the liquid-to-gas phase change. Said another way, the controller may include a phase change table or graph that for a given temperature or pressure provides the corresponding pressure or temperature, respectively, at which LPG transitions between liquid and gaseous phases. However, in other examples, the desired vapor injection pressure may be set at the liquid-gas phase pressure, or above the liquid-gas phase change pressure.

The method 300 at 314 may additionally comprise stopping the flow of LPG to the PFI rail if the controller determines that condensation of LPG is occurring. For example, when the PFI rail temperature decreases and/or pressure increases to within a threshold of the condensation point for LPG, or reach the condensation point, the controller may close the vapor injector and stop the supply of LPG to the PFI rail from the DI rail. Method 300 then continues from 314 to 320 which comprises determining if direct injection of LPG is desired.

Alternatively, method 300 may proceed to 320 by first executing 316 and 318 if it is determined at 312 that port injection is desired. Thus, method 300 may continue from 312 to 316 if port injection is desired. At 316 the desired vapor injection pressure is determined based on PFI rail pressure and/or temperature. As explained above at 314, the desired vapor injection pressure may be set below the liquid to gas phase change pressure for LPG at the current PFI rail temperature. Continuing from 316 to 318, the PFI rail pressure may then be feedback controlled to the desired vapor injection pressure by adjusting the amount of LPG supplied to the PFI rail from the DI rail. For example, the controller may adjust an amount of LPG expelled from the DI rail via the vapor injector and supplied to the PFI rail, to maintain the PFI rail pressure at the desired vapor injection pressure to reduce and/or prevent condensation in the PFI rail. Thus, the controller may close the vapor injector and reduce an amount of LPG supplied to the PFI rail responsive to decreases in the PFI rail temperature (which would decrease the desired vapor injection pressure) and/or the measured PFI rail pressure increasing above the desired vapor injection pressure.

Continuing from either 318 or 314 to 320, direct injection may be desired when the LPG in the DI rail is liquid and/or when liquid LPG exists at the PFI rai. Thus, direct injection may be desired at lower ambient temperatures, lower fuel tank temperatures, and lower DI rail temperatures where LPG is more likely to exist in liquid form. For example, direct injection may be desired when one or more of the ambient temperature, fuel tank temperature, and DI rail temperature decrease below respective second thresholds. The second thresholds may in some examples be set above the first thresholds discussed above at 312, such that there are a range of temperatures between the first and second thresholds at which both port injection and direction injection are desired. However, in another examples, the second thresholds may be equal to or less than the first thresholds, one of either port injection or direct injection may be desired at a time.

If direct injection is not desired, then method 300 continues from 320 to 322 which comprises not direct injecting LPG, continuing to supply LPG to the PFI rail, and port injecting via the port injectors into one or more intake ducts of the engine cylinders. Method 300 then returns.

However, if at 320 direct injection is desired, method 300 may continue to 324 which comprises determining desired port injection and direct injection amounts. For example, the controller may determine a total fuel volume or mass to be injected during an engine cycle by both the port and direct injectors to achieve a desired air/fuel ratio, driver demanded torque, etc. The controller may then proportion the total fuel volume or mass amongst the direct and port injectors. At 326, the controller may begin direct injection with a low fuel fraction of the total fuel volume or mass to be injected. Thus, the controller may inject a greater proportion of the total fuel volume via the port injectors. Said another way, when direct injection is desired, the controller may begin direct injecting by first injecting a small, pre-set, amount of fuel that is less than what would ordinarily be desired under closed loop control.

The controller may then determine at 328 whether the LPG being direct injected into the engine cylinders is liquid or gaseous. If the LPG being direct injected is vapor, then method 300 continues from 328 to 330 which comprises reducing and/or stopping the direct injection of LPG and increasing port injection accordingly. Thus, if the LPG in the DI rail is gaseous and the direct injectors are injecting LPG vapor, then the controller may switch to only port injecting the LPG and not direct injecting the LPG. The controller may increase the port injection in proportion to the amount it reduces the direct injection to maintain the total fuel volume or mass. Method 300 then returns.

It should be appreciated that in some examples the total fuel volume or mass may depend on the ratio of port injection to direct injection. Thus, the total fuel volume or mass may be adjusted by the controller depending on the relative fuel fractions for the direct and port injectors.

However, if at 328 it is determined that the LPG being injected by the direct injectors is liquid, then method 300 continues from 328 to 332 which comprises increasing the direct injection fuel fraction to a desired level and reducing the port injection accordingly. For example, the controller may include a look-up table or other known relationship for determining the desired ratio of port injection to direct injection for PFDI operation under varying engine operating conditions. Thus, when direct injection of LPG is desired, the controller may begin by direct injecting a small amount of fuel if it is unknown whether the LPG being direct injected is liquid or gaseous. Once the phase (liquid or gas) of the LPG being direct injected is known, the controller may then adjust engine operation accordingly. For example, the controller may reduce direct injection amounts if the LPG is gaseous, and conversely may increase direct injection amounts if the LPG is liquid.

When direct injecting the LPG, the LPG may be injected when the in-cylinder pressure is substantially low, lower than it would ordinarily be when injecting in the high pressure mode and injecting a fuel other than LPG. For example, LPG may be injected by the direct injectors when the piston (e.g., piston 138 described above in FIG. 1) is at or near bottom-dead-center (BDC). However, in other examples, the timing of the LPG direct injection may be adjusted based on the in-cylinder pressure. For example, the LPG may be injected when the in-cylinder pressure decreases below the DI rail pressure and/or below a threshold. For example, LPG may be injected during the intake stroke of the piston, during, or proximate to a minimum in-cylinder pressure of the cylinder during the intake stroke of the piston. For example, LPG may be injected when the intake valve begins to open, or after immediately after the intake valve opens and before the in-cylinder pressure starts to increase during the compression stroke. Thus, LPG is not injected during the compression stroke.

In another embodiment the method 300 may comprise employing central fuel injection (CFI) instead of or in addition to port injection. Thus, the method may comprise supplying LPG from the DI rail to a CFI injector, instead of or in addition to supplying LPG from the DI rail to the PFI rail at, for example, 314, 318, and 322. Further, the method may comprise injecting LPG into a common intake manifold via the CFI injector instead of, or in addition to, injecting LPG into intake ports via the PFI injectors at, for example, 322, 300, and 332. And, at 312, the method may alternatively or additionally comprise determining if CFI injection is desired, which may be accomplished in the same or similar manner as that already described at 312.

Method 300 then returns.

Continuing to FIG. 4, it shows an example method 400 for supplying LPG to the DI and PFI rails of the fuel system. Method 400 begins at 402 which comprises pumping LPG from the fuel tank to the DI rail based on a difference between the desired DI rail pressure and an estimated DI rail pressure. As explained above with reference to FIG. 3, the DI rail pressure may be estimated based on outputs from the DI rail pressure sensor, and the desired DI rail pressure may be set to a lower second pressure which is less than the pressure at which the desired DI rail pressure would be set to when injecting a fuel other than LPG and where the DI pump is activated and in a pressurizing mode. Method 400 then continues from 402 to 404 which comprises adjusting the amount of LPG supplied to the PFI rail based on a difference between the desired vapor injection pressure and the estimated PFI rail pressure as described above in greater detail in FIG. 3. Thus, the controller may regulate the amount of LPG supplied to the PFI rail by the DI rail by adjusting the vapor injector, and may increase or decrease the amount of LPG supplied to the PFI rail by opening or closing, respectively, the vapor injector to maintain the PFI rail pressure at the desired vapor injection pressure.

Method 400 may then proceed from 404 to 406 which comprises coordinating lift pump operation with the supply of LPG to the PFI rail. For example, at 407, when more LPG is to be supplied to the PFI rail from the DI rail, the controller may pre-emptively increase lift pump power to compensate for the anticipated drop in DI rail pressure that is expected to result from the increase in LPG leaving the DI rail to the PFI rail. In another example, the controller may delay an increase in LPG supply to the PFI rail to account for lift pump spin-up time. Thus, the controller may coordinate operation of the lift pump and the vapor injector, and schedule desired changes in their electrical power, to maintain both the DI rail and the PFI rail at their respective desired pressures.

From 406, method 400 may continue to 408 which comprises injecting LPG from the DI rail into a cooling chamber (cooling chamber 256 described above in FIG. 2) and depressurizing the LPG. The injecting the LPG into the cooling chamber may be achieved by opening the vapor injector. For example, the controller may adjust a pulse width of a command signal sent to the vapor injector.

Because the controller maintains the PFI rail at a lower pressure than the DI rail (by maintaining the vapor injector closed other than when injecting LPG), the pressure of the LPG is reduced after injection into the cooling chamber. As a result, the temperature of the LPG is reduced when it is injected into the cooling chamber from the DI rail, and in some examples, the LPG may be vaporized if it is not already vapor.

Method 400 then continues from 408 to 410 which comprises cooling the DI rail with the LPG contained in the cooling chamber. Thus, since the LPG depressurizes and cools as it is injected into the cooling chamber, the cooling chamber may be at a lower temperature than the DI rail. By positioning the cooling chamber in thermal contact with the DI rail (as explained in greater detail above with reference to FIG. 2), the colder LPG in the cooling chamber may absorb heat from the DI rail, thus reducing the temperature of the DI rail. Heating the LPG in the cooling chamber reduces condensation of the gaseous LPG, ensuring that the PFI rail is supplied with LPG vapor. Further, cooling the DI rail with LPG in the cooling chamber reduces vaporization of LPG in the DI rail, and increases the amount of liquid LPG available for direct injection. In this way, more stable LPG injection may be maintained over a wider range of engine operating temperatures and ambient temperatures. That is, by exposing the hotter, higher pressure LPG in the DI rail to the colder, lower pressure LPG in the cooling chamber, liquid LPG injection may be achieved at higher ambient temperatures, and vapor LPG injection may be achieved at lower ambient temperatures than would be achieved by routing LPG independently from the lift pump to each of the fuel rails.

Method 400 then continues from 410 to 412 which comprises flowing LPG from the cooling chamber to the PFI rail. LPG in the PFI rail may then be injected into intake ports of the engine cylinders as desired at 414.

However, in another embodiment, the method 400 may alternatively comprise flowing LPG from the cooling chamber to a common fuel injection (CFI) injector to inject fuel into a common intake manifold rather than intake ports. Thus, the method 400 may not include 412 and 414, and may flow LPG from the DI rail to the CFI injector instead of flowing the LPG to the PFI rail from the DI rail, and may include injecting fuel into the common intake manifold via the CFI injector instead of into distinct intake ports via the port injectors.

The controller does not return LPG to upstream of the DI rail once the LPG has been pumped to the DI rail by the lift pump as indicated at 416 of method 400. That is, fuel flow does back to the fuel tank from the DI rail. Thus, fuel exits the DI rail only by either direct injection into the engine cylinder, or injection to the PFI rail. In this way, the controller flows LPG to the PFI rail from the DI rail, without flowing the LPG to any portion of fuel system included upstream of the DI rail. At most therefore, LPG flows through only the cooling chamber and one or more PFI supply lines (e.g., PFI supply lines 246 and 266 described above in FIG. 2) coupling the PFI rail and DI rail en route from the DI rail 250 to the PFI rail 260. Method 400 then returns.

Turning to FIG. 5, it shows a graph 500 of an example liquid-gas phase change curve 502 for LPG that may be used to determine the phase (liquid or gas) of LPG in a fuel system component (e.g., DI rail 250 described above in FIG. 2). The graph 500 shows example temperatures along the horizontal axis in degrees Celsius, and example pressures along the vertical axis in Bars. The graph 500 may be stored in non-transitory memory of a controller (e.g., controller 222 described above in FIG. 2) and may be used to determine whether LPG in a fuel system (e.g., fuel system 200 described above in FIG. 2) is gaseous or liquid based on the temperature and/or pressure of the fuel system component. When the measured temperature and pressure of the LPG plots to a point above the phase change curve 502, the LPG is liquid, and when the measured temperature and pressure of the LPG plots to a point below the phase change curve 502, the LPG is gaseous. Thus, in the example of FIG. 5, for a given temperature, if a measured pressure is greater than (above) the liquid-gas phase change curve 502, LPG may be in liquid form, and when the pressure is less than (below) the liquid-gas phase change curve 502, LPG may be in gaseous form. Similarly, for a given pressure, if the measured temperature is greater than (to the right of) the liquid-gas phase change curve 502, then LPG may be gaseous, but if the measured temperature is less than (to the left of) the liquid-gas phase change curve 502, then the LPG may be liquid.

Thus, the controller may determine whether LPG in a particular fuel system component (e.g., DI fuel rail 250 and PFI fuel rail 260 described above in FIG. 2) is in gaseous or liquid form by comparing the estimated temperature and pressure of the LPG to the liquid-gas phase change curve 502.

In one representation, a method comprises: supplying liquefied petroleum gas (LPG) from a fuel rail to a direct injection injector that injects fuel directly into a cylinder of an engine, and flowing LPG from the fuel rail to an intake fuel injector that is not a direct injection injector without returning the LPG to a fuel tank, where the intake fuel injector injects fuel, from a position outside the cylinder, into an intake passage that feeds the cylinder. In a first example of the method, the intake fuel injector comprises a port fuel injector that injects fuel into an intake port of the cylinder, and where flowing the LPG from the fuel rail to the intake fuel injector comprises first flowing the LPG from the fuel rail to a port injection fuel rail, and then flowing the LPG from the port injection fuel rail to the intake fuel injector. A second example of the method optionally includes the first example and further includes, pumping liquefied petroleum gas (LPG) from the fuel tank to the fuel rail via a first fuel supply line, wherein the pumping the LPG from the fuel tank to the fuel rail comprises pumping the LPG from the fuel tank to the fuel rail with only a lift pump, and not further pressurizing the LPG with a higher pressure or direct injection pump. A third example of the method optionally includes one or more of the first and second examples, and further includes, wherein the first fuel supply line is coupled on a first end to the fuel tank and on an opposite second end to an inlet end of the fuel rail, and where a second fuel supply line couples the fuel rail to the intake fuel injector, where the second fuel supply line is coupled to an outlet end of the first fuel rail, the outlet end different than the inlet end. A fourth example of the method optionally includes one or more of the first through third examples, and further includes, stopping the flow of LPG from the fuel rail to the intake fuel injector in response to LPG condensing at the intake fuel injector. A fifth example of the method optionally includes one or more of the first through fourth examples, and further includes, wherein the intake fuel injector comprises a central fuel injector that injects fuel into an intake manifold of the engine. A sixth example of the method optionally includes one or more of the first through fifth examples, and further includes, wherein the flowing LPG from the fuel rail to the intake fuel injector comprises, injecting LPG from the fuel rail into a cooling chamber, where a pressure of the cooling chamber is less than a pressure of the first fuel rail. A seventh example of the method optionally includes one or more of the first through sixth examples, and further includes, wherein the flowing LPG from the fuel rail to the intake fuel injector further comprises, cooling the fuel rail with vaporized LPG contained within the cooling chamber. An eighth example of the method optionally includes one or more of the first through seventh examples, and further includes, feedback controlling a lift pump to maintain the fuel rail at a lower pressure than would be desired when direct injecting a fuel other than LPG. A ninth example of the method optionally includes one or more of the first through eighth examples, and further includes, not pumping LPG directly from the fuel tank to the intake fuel injector without first flowing the LPG through the fuel rail.

In another representation a method comprises, pumping liquefied petroleum gas (LPG) from a fuel tank to a first fuel rail via a first fuel supply line; and supplying LPG from the first fuel rail to a second fuel rail via a second fuel supply line without returning the LPG to the fuel tank or the first fuel supply line. In a first example of the method, the first fuel rail comprises a direct injection (DI) fuel rail and the second fuel rail comprises a port fuel injection (PFI) rail. A second example of the method optionally includes the first example and further includes, wherein the pumping the LPG from the fuel tank to the first fuel rail comprises pumping the LPG from the fuel tank to the first fuel rail with only a lift pump, and not further pressurizing the LPG with a higher pressure or direct injection pump. A third example of the method optionally includes one or more of the first and second examples, and further includes, wherein the first fuel supply line is coupled on a first end to the fuel tank and on an opposite second end to an inlet end of the first fuel rail, and where the second fuel supply line is coupled on a first end to an outlet end of the first fuel rail, the outlet end different than the inlet end, and on an opposite second end to an inlet end of the second fuel rail. A fourth example of the method optionally includes one or more of the first through third examples, and further includes, direct injecting LPG from the first fuel rail into engine cylinders via direct injectors. A fifth example of the method optionally includes one or more of the first through fourth examples, and further includes, port injecting LPG from the second fuel rail into intake ports of engine cylinders via port fuel injectors. A sixth example of the method optionally includes one or more of the first through fifth examples, and further includes, wherein the supplying LPG from the first fuel rail to the second fuel rail comprises, injecting LPG from the first fuel rail into a cooling chamber, where a pressure of the cooling chamber is less than a pressure of the first fuel rail. A seventh example of the method optionally includes one or more of the first through sixth examples, and further includes, wherein the supplying LPG from the first fuel rail to the second fuel rail comprises, cooling the first fuel rail with vaporized LPG contained in the second fuel supply line, where a pressure of the vaporized LPG is less than a pressure of the first fuel rail. An eighth example of the method optionally includes one or more of the first through seventh examples, and further includes, wherein the pumping LPG from the fuel tank to the first fuel rail via a first fuel supply line comprises feedback controlling a lift pump to maintain the first fuel rail at a lower pressure than would be desired when direct injecting a fuel other than LPG. A ninth example of the method optionally includes one or more of the first through eighth examples, and further includes, not pumping LPG directly from the fuel tank to the second fuel rail without first flowing the LPG through the first fuel rail.

In another representation, a method for an engine may comprise: pumping LPG from a fuel tank to a direct injection (DI) fuel rail; directly injecting liquid LPG into at least one cylinder of the engine via one or more direct injectors coupled to the DI fuel rail; and ejecting vaporized LPG from the DI fuel rail to an intake injector that is not a direct injector. In a first example of the method, the method may further comprise, deactivating a direct injection pump, wherein the deactivating the direct injection pump comprises maintaining an inlet valve of the direction injection pump open during both suction and compression strokes of the direct injection pump such that the direct injection pump does not add pressure to the LPG pumped to the DI fuel rail by a lift pump, and wherein the pumping LPG from the fuel tank to the DI fuel rail comprises only pressurizing the LPG with the lift pump. A second example of the method optionally includes the first example and further includes, wherein the directly injecting liquid LPG into at least one cylinder of the engine comprises low pressure direct injecting LPG into the engine cylinders when cylinder pressure is less than an outlet pressure of the lift pump. A third example of the method optionally includes one or more of the first and second examples, and further includes, port injecting LPG from a PFI fuel rail into an intake port of a cylinder of the engine via the intake injector, where the intake injector comprises a port injector, when a temperature of the PFI fuel rail is greater than a second threshold, and wherein the directly injecting liquid LPG into at least one cylinder of the engine comprises low pressure direct injecting LPG when a temperature of the DI fuel rail is less than a first threshold. A fourth example of the method optionally includes one or more of the first through third examples, and further includes, wherein the first threshold is greater than the second threshold, such that between the first and second thresholds, the method comprises both direct injecting and port injecting. A fifth example of the method optionally includes one or more of the first through fourth examples, and further includes, when direct injecting and port injecting, beginning the direct injecting with a pre-set amount of LPG, and then increasing the direct injection when injecting liquid LPG, and decreasing the direct injection when injecting gaseous LPG. A sixth example of the method optionally includes one or more of the first through fifth examples, and further includes, feedback controlling a PFI fuel rail to a lower pressure than the DI fuel rail by regulating an amount of LPG ejected from the DI fuel rail to the PFI fuel rail, wherein the PFI fuel rail pressure is feedback controlled to below a liquid-to-gas phase change pressure for LPG in the PFI fuel rail. A seventh example of the method optionally includes one or more of the first through sixth examples, and further includes wherein feedback controlling the PFI fuel rail to below the liquid-to-gas phase change pressure for the LPG in the PFI fuel rail comprises: determining a liquid-to-gas phase change pressure for LPG in the PFI fuel rail based on a current PFI fuel rail temperature; setting a desired PFI fuel rail pressure to below the determined liquid-to-gas phase change pressure; and adjusting an injector supplying LPG from the DI fuel rail to PFI fuel rail to maintain the PFI fuel rail pressure at the desired PFI fuel rail pressure.

In another representation a fuel system comprises: a lift pump; a direct injection fuel rail coupled to the lift pump via a first fuel supply line; a port injection fuel rail coupled downstream, and in series with, the direct injection fuel rail via a second fuel supply line, where the port injection fuel rail and second fuel supply line are at a lower pressure than the direct injection fuel rail; an injector for supplying fuel from the direct injection fuel rail to the port injection fuel rail; and a controller in electrical communication with the lift pump and injector, the controller including computer-readable instruction stored in non-transitory memory for: feedback controlling the lift pump in a low pressure direct injection mode; and feedback controlling the injector to maintain a pressure of the port injection fuel rail below a pressure of the direct injection fuel rail and below an LPG liquid-to-gas phase change pressure, the LPG liquid-to-gas phase change pressure based on a temperature of the port injection fuel rail. The fuel system may further comprise a cooling chamber positioned in the second fuel supply line and in thermal contact with the direct injection fuel rail, for cooling the direct injection fuel rail via lower pressure fuel in the second fuel supply line.

In another representation a method for an engine comprises direct injecting liquefied petroleum gas (LPG) into an engine cylinder from a first fuel rail; supplying LPG from the first fuel rail to a second fuel rail; and port injecting LPG into an intake port of the cylinder from the second fuel rail.

In another representation a method for an engine comprises: direct injecting LPG that has not been pressurized by a DI pump into an engine cylinder via one or more fuel injectors of a DI fuel rail when one or more of a temperature of the DI fuel rail is less than a temperature threshold and a pressure of the cylinder is less than a pressure threshold; and port injecting LPG into an intake port of the cylinder via one or more fuel injectors of a PFI rail.

In another representation a method for an engine comprises: pumping LPG from a fuel tank to a DI fuel rail; flowing vaporized LPG gasses in the DI fuel rail out of the DI fuel rail; depressurizing the vaporized LPG gasses; cooling LPG in the DI fuel rail by flowing the depressurized LPG gasses past the DI fuel rail; and supplying the depressurized LPG gasses to a PFI fuel rail.

In another representation a method for an engine comprises: deactivating a DI fuel pump; pumping LPG from a fuel tank to DI and PFI fuel rails via a lift pump; and injecting LPG from either the DI or PFI fuel rails, or both, based on cylinder pressure and fuel temperature.

In another representation a method for an engine comprises: deactivating one or more direct fuel injectors positioned in a DI fuel rail and only injecting LPG into an intake port of an engine cylinder via one or more port fuel injectors when a temperature of the DI fuel rail is greater than a threshold; and reactivating the direct fuel injectors when the temperature of the DI fuel rail increases above the threshold, the reactivating comprising: direct injecting a pre-set amount of fuel; determining whether the direct injected fuel was liquid or gaseous; increasing the amount of direct injected fuel from the pre-set amount to a desired amount in response to determining that the pre-set amount of injected fuel was liquid; and deactivating the direct injectors in response to determining that the pre-set amount of injected fuel was gaseous.

In this way, a technical effect of reducing fuel system cost and complexity is achieved by low pressure direct injecting LPG because the higher pressure direct injection pump may be removed/omitted from the fuel system. In examples where the direct injection pump is retained in the fuel system, but is rendered inactive, pump longevity may be enhanced by reducing the amount of fuel vapors entering the pump inlet. Fuel vapors may be reduced by omitting fuel return lines in the fuel system, and cooling the direct injection rail with vapors sourced from the direct injection rail that have been depressurized (and thus cooled). Omitting the fuel return lines further reduces the cost and complexity of the fuel system.

Further, technical effects of reducing air-fuel ratio errors, increasing engine performance, and increasing the LPG temperature operating range may be achieved by cooling the direct injection rail with the depressurized LPG vapors. Further vaporization of LPG in the direct injection rail may be reduced, thereby reducing air-fuel ratio errors, reducing the knock, and increasing engine performance and robustness. Correspondingly, by heating the depressurized LPG vapors with the hotter direct injection fuel rail, condensation of LPG in the port fuel injection rail may be reduced, thereby reducing air-fuel ratio errors and increasing engine performance and robustness. As a result, robust LPG engine fueling may be achieved over a wider range of ambient and engine operating temperatures.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    supplying liquefied petroleum gas (LPG) from a fuel rail to a direct injection injector that injects LPG directly into a cylinder of an engine; and
    flowing LPG from the fuel rail to an intake fuel injector that is not a direct injection injector without returning LPG to a fuel tank, where the intake fuel injector injects LPG, from a position outside the cylinder, into an intake passage that feeds the cylinder, wherein the intake fuel injector comprises a port fuel injector that injects fuel into an intake port of the cylinder, and where flowing LPG from the fuel rail to the intake fuel injector comprises first flowing LPG from the fuel rail to a port injection fuel rail, and then flowing LPG from the port injection fuel rail to the intake fuel injector.

2. The method of claim 1, further comprising pumping LPG from the fuel tank to the fuel rail via a first fuel supply line, wherein the pumping LPG from the fuel tank to the fuel rail comprises pumping LPG from the fuel tank to the fuel rail with only a lift pump, and not further pressurizing LPG with a higher pressure or direct injection pump.

3. The method of claim 2, wherein the first fuel supply line is coupled on a first end to the fuel tank and on an opposite second end to an inlet end of the fuel rail, and where a second fuel supply line couples the fuel rail to the intake fuel injector, where the second fuel supply line is coupled to an outlet end of the first fuel rail, the outlet end of the fuel rail different than the inlet end.

4. The method of claim 1, further comprising, determining whether LPG condenses responsive to conditions in the fuel rail, and stopping the flow of LPG from the fuel rail to the intake fuel injector in response to the determination of LPG condensing at the intake fuel injector.

5. The method of claim 1, wherein the intake fuel injector comprises a central fuel injector that injects LPG into an intake manifold of the engine.

6. The method of claim 1, wherein the flowing LPG from the fuel rail to the intake fuel injector comprises injecting LPG from the fuel rail into a cooling chamber, where a pressure of the cooling chamber is maintained below a pressure of the fuel rail.

7. The method of claim 6, wherein the flowing LPG from the fuel rail to the intake fuel injector further comprises cooling the fuel rail with vaporized LPG contained within the cooling chamber.

8. The method of claim 1, further comprising feedback controlling a lift pump to maintain the fuel rail at a lower pressure than would be desired when direct injecting a fuel other than LPG.

9. The method of claim 1, further comprising not pumping LPG directly from the fuel tank to the intake fuel injector without first flowing LPG through the fuel rail.

10. A method for an engine, comprising:
    pumping LPG from a fuel tank to a direct injection (DI) fuel rail;
    directly injecting liquid LPG into at least one cylinder of the engine via one or more direct injectors coupled to the DI fuel rail;
    ejecting vaporized LPG from the DI fuel rail to an intake injector that is not a direct injector without returning the vaporized LPG to the fuel tank; and
    port injecting LPG from a PFI fuel rail into an intake port of a cylinder of the engine via the intake injector, where the intake injector comprises a port injector, when a temperature of the PFI fuel rail is greater than a second threshold, and wherein the directly injecting liquid LPG into at least one cylinder of the engine comprises low pressure direct injecting LPG when a temperature of the DI fuel rail is less than a first threshold.

11. The method of claim 10, further comprising deactivating a direct injection pump that pumps LPG from the fuel tank to the DI fuel rail, wherein the deactivating the direct injection pump comprises maintaining an inlet valve of the direct injection pump open during both suction and compression strokes of the direct injection pump such that the direct injection pump does not add pressure to the LPG pumped to the DI fuel rail by a lift pump, and wherein the pumping LPG from the fuel tank to the DI fuel rail comprises only pressurizing the LPG with the lift pump.

12. The method of claim 11, wherein the directly injecting liquid LPG into the at least one cylinder of the engine comprises low pressure direct injecting LPG into engine cylinders when cylinder pressure is less than an outlet pressure of the lift pump.

13. The method of claim 10, wherein the first threshold is greater than the second threshold, such that between the first and second thresholds, the method comprises both direct injecting and port injecting.

14. The method of claim 13, further comprising, when direct injecting and port injecting, beginning the direct injecting with a pre-set amount of LPG, and then increasing the direct injection when injecting liquid LPG, and decreasing the direct injection when injecting gaseous LPG.

15. The method of claim 10, wherein the intake injector is coupled to the PFI fuel rail which in turn is coupled to the DI fuel rail, and further comprising feedback controlling the PFI fuel rail to a lower pressure than the DI fuel rail by regulating an amount of LPG ejected from the DI fuel rail to the PFI fuel rail, wherein a PFI fuel rail pressure is feedback controlled to below a liquid-to-gas phase change pressure for LPG in the PFI fuel rail.

16. The method of claim 15, wherein feedback controlling the PFI fuel rail to below the liquid-to-gas phase change pressure for the LPG in the PFI fuel rail comprises:
   determining the liquid-to-gas phase change pressure for LPG in the PFI fuel rail based on a current PFI fuel rail temperature;
   setting a desired PFI fuel rail pressure to below the determined liquid-to-gas phase change pressure; and
   adjusting an injector supplying LPG from the DI fuel rail to the PFI fuel rail to maintain the PFI fuel rail pressure at the desired PFI fuel rail pressure.

17. A fuel system comprising:
   a lift pump;
   a direct injection fuel rail coupled to the lift pump via a first fuel supply line;
   a port injection fuel rail coupled downstream, and in series with, the direct injection fuel rail via a second fuel supply line, where the port injection fuel rail and the second fuel supply line are at a lower pressure than the direct injection fuel rail;
   an injector coupled between the direct injection fuel rail and the port injection fuel rail to supply fuel from the direct injection fuel rail to the port injection fuel rail; and
   a controller in electrical communication with the lift pump and the injector, the controller including computer-readable instruction stored in non-transitory memory to:
      feedback control the lift pump in a low pressure direct injection mode; and
      feedback control the injector to maintain a pressure of the port injection fuel rail below a pressure of the direct injection fuel rail and below an LPG liquid-to-gas phase change pressure, the LPG liquid-to-gas phase change pressure based on a temperature of the port injection fuel rail.

18. The fuel system of claim 17, further comprising a cooling chamber positioned in the second fuel supply line and in thermal contact with the direct injection fuel rail, to cool the direct injection fuel rail via lower pressure fuel in the second fuel supply line.

\* \* \* \* \*